United States Patent
Tandon et al.

(10) Patent No.: US 10,947,889 B2
(45) Date of Patent: Mar. 16, 2021

(54) EXHAUST GAS AFTERTREATMENT MODULE SUPPORT ASSEMBLY

(71) Applicant: CUMMINS INC., Columbus, IN (US)

(72) Inventors: Atin Tandon, Greenwood, IN (US); Timothy Mallett, Wellingbouough (GB); Andris J. Maldups, Chelsea, MI (US); Ninad S. Shrotriya, Pune (IN); Jithin Joseph, Northville, MI (US); Steve Halas, Columbus, IN (US); Daniel Coppola, Columbus, IN (US); Alexander Nazarov, Zionsville, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/527,970

(22) Filed: Jul. 31, 2019

(65) Prior Publication Data

US 2021/0033018 A1 Feb. 4, 2021

(51) Int. Cl.
*F01N 3/00* (2006.01)
*F01N 13/18* (2010.01)
*F01N 3/035* (2006.01)
*F01N 3/20* (2006.01)

(52) U.S. Cl.
CPC .......... *F01N 13/1811* (2013.01); *F01N 3/035* (2013.01); *F01N 3/2066* (2013.01)

(58) Field of Classification Search
CPC ......... F01N 13/1811; F01N 3/035; F01N 3/08
USPC ......................................................... 60/297
See application file for complete search history.

(56) References Cited

U.S. PATENT DOCUMENTS

| 8,191,668 | B2 | 6/2012 | Keane et al. | |
|---|---|---|---|---|
| 8,365,518 | B2 * | 2/2013 | Ezawa | E02F 9/2095 60/297 |
| 8,418,448 | B2 | 4/2013 | Kamata et al. | |
| 8,915,071 | B2 | 12/2014 | Mitsuda | |
| 9,382,690 | B2 | 7/2016 | Okuda et al. | |
| 9,435,294 | B2 | 9/2016 | Fukuyoshi | |
| 2010/0186388 | A1 * | 7/2010 | Olsen | F01N 13/00 60/295 |
| 2010/0314504 | A1 * | 12/2010 | Dickinson | F01N 13/1855 248/74.1 |
| 2011/0099978 | A1 * | 5/2011 | Davidson | B01D 53/9495 60/274 |
| 2011/0146248 | A1 * | 6/2011 | Charles | F01N 13/1855 60/295 |

(Continued)

FOREIGN PATENT DOCUMENTS

WO WO-2010/085789 A2 7/2010

*Primary Examiner* — Jason D Shanske
(74) *Attorney, Agent, or Firm* — Foley & Lardner LLP

(57) ABSTRACT

An exhaust gas aftertreatment module support assembly for supporting an exhaust gas aftertreatment module above a cylinder head and a cylinder block of an internal combustion engine includes a first mounting bracket, a second mounting bracket, and a cradle assembly. The first mounting bracket is configured to be coupled to the cylinder block. The second mounting bracket is configured to be coupled to the cylinder block. The cradle assembly is selectively coupled to the first mounting bracket and the second mounting bracket. The cradle assembly includes a first cradle bracket and a second cradle bracket. The first cradle bracket has a first cradle bracket cradle surface that is configured to interface with the exhaust gas aftertreatment module.

15 Claims, 18 Drawing Sheets

(56) References Cited

U.S. PATENT DOCUMENTS

| | | | |
|---|---|---|---|
| 2012/0011833 A1* | 1/2012 | Kamei | E02F 9/0866 60/297 |
| 2012/0017574 A1* | 1/2012 | Hasan | F01N 13/1805 60/297 |
| 2012/0273648 A1 | 11/2012 | Maske et al. | |
| 2013/0305688 A1* | 11/2013 | Kosaka | F01N 13/1844 60/272 |
| 2015/0167523 A1 | 6/2015 | Tsutsumi et al. | |
| 2015/0204221 A1* | 7/2015 | Fukuyoshi | F01N 13/0097 248/639 |
| 2015/0306950 A1* | 10/2015 | Sandou | F01N 13/1855 60/297 |
| 2016/0061090 A1* | 3/2016 | Anand | F01N 3/035 60/297 |
| 2018/0142604 A1* | 5/2018 | Niaz | B01D 53/944 |

\* cited by examiner

EXHAUST GAS AFTERTREATMENT MODULE SUPPORT ASSEMBLY

TECHNICAL FIELD

The present application relates generally to systems and methods for supporting an aftertreatment module on an internal combustion engine.

BACKGROUND

For internal combustion engines, such as diesel internal combustion engines, nitrogen oxide ($NO_x$) compounds may be emitted in exhaust gas. It may be desirable to reduce $NO_x$ emissions to comply with environmental regulations. To reduce $NO_x$ emissions, a reductant may be dosed into the exhaust by a dosing system and within an exhaust gas aftertreatment system. The reductant facilitates conversion of a portion of the exhaust gas into non-$NO_x$ emissions, such as nitrogen ($N_2$), carbon dioxide ($CO_2$), and water ($H_2O$), thereby reducing $NO_x$ emissions.

The exhaust gas aftertreatment system may include several components. These components may be mounted to various locations surrounding the internal combustion engine. For example, the components of the exhaust gas aftertreatment system may be mounted to a frame within which the internal combustion engine is located and/or which surrounds the internal combustion engine. As a consequence of being mounted around the internal combustion engine, these components significantly increase a physical footprint of the internal combustion engine. Additionally, it may be difficult to robustly support these components in a way that does not substantially increase the physical footprint of the internal combustion engine and that does not expose heat-sensitive or vibrational-sensitive components to relatively high temperatures or relatively high vibrations that are often produced by the internal combustion engine.

SUMMARY

In one embodiment, an exhaust gas aftertreatment module support assembly for supporting an exhaust gas aftertreatment module above a cylinder head and a cylinder block of an internal combustion engine includes a first mounting bracket, a second mounting bracket, and a cradle assembly. The first mounting bracket is configured to be coupled to the cylinder block. The second mounting bracket is configured to be coupled to the cylinder block. The cradle assembly is selectively coupled to the first mounting bracket and the second mounting bracket. The cradle assembly includes a first cradle bracket and a second cradle bracket. The first cradle bracket has a first cradle bracket cradle surface that is configured to interface with the exhaust gas aftertreatment module. The second cradle bracket has a second cradle bracket cradle surface that is configured to interface with the exhaust gas aftertreatment module. The exhaust gas aftertreatment module is separated from the cylinder head when the cradle assembly is coupled to the first mounting bracket and the second mounting bracket, the first cradle bracket interfaces with the exhaust gas aftertreatment module, and the second cradle bracket interfaces with the exhaust gas aftertreatment module.

In another embodiment, an exhaust gas aftertreatment module support assembly includes a first mounting bracket, a second mounting bracket, and a cradle assembly. The cradle assembly is selectively coupled to the first mounting bracket and the second mounting bracket. The cradle assembly includes a first cradle bracket, a first cradle band, a second cradle bracket, a second cradle band, a first rail, and a second rail. The first cradle bracket has a first cradle bracket cradle surface that is at least partially disposed along a first circular arc. The first cradle band is coupled to the first cradle bracket and has a first cradle band cradle surface at least partially disposed along a second circular arc. The second cradle bracket has a second cradle bracket cradle surface that is at least partially disposed along a third circular arc. The second cradle band is coupled to the second cradle bracket and has a second cradle band cradle surface at least partially disposed along a fourth circular arc. The first rail is coupled to the first cradle bracket and the second cradle bracket. The second rail is coupled to the first cradle bracket and the second cradle bracket.

In another embodiment, an exhaust gas aftertreatment system for an internal combustion engine having a cylinder block and a cylinder head. The exhaust gas aftertreatment system includes an exhaust gas aftertreatment module and an exhaust gas aftertreatment module support assembly. The exhaust gas aftertreatment module includes an inlet endcap, a body, and an outlet endcap. The inlet endcap is configured to receive exhaust gas. The body is configured to receive the exhaust gas from the inlet endcap. The outlet endcap is configured to receive the exhaust gas from the body and to provide the exhaust gas. The exhaust gas aftertreatment module support assembly includes a first mounting bracket, a second mounting bracket, and a cradle assembly. The first mounting bracket is configured to be coupled to the cylinder block. The second mounting bracket is configured to be coupled to the cylinder block. The cradle assembly is selectively coupled to the first mounting bracket and the second mounting bracket. The cradle assembly includes a first cradle bracket and a second cradle bracket. The first cradle bracket has a first cradle bracket cradle surface that interfaces with the body adjacent the inlet endcap. The second cradle bracket has a second cradle bracket cradle surface that interfaces with the body adjacent the outlet endcap. The exhaust gas aftertreatment module is separated from the cylinder head when the cradle assembly is coupled to the first mounting bracket and the second mounting bracket.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
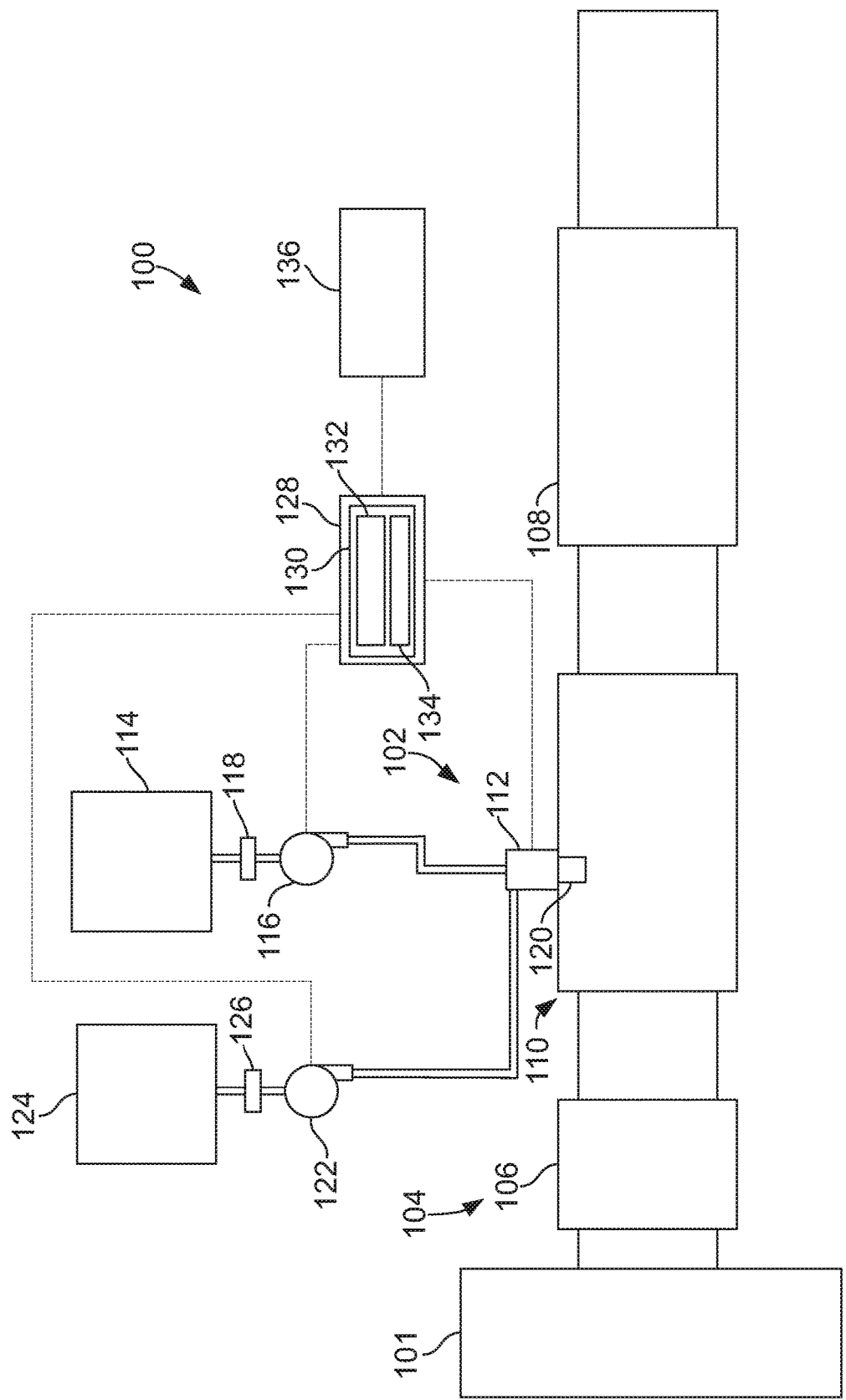
FIG. 1 is a block schematic diagram of an example exhaust gas aftertreatment system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and for supporting an exhaust gas aftertreatment module on an internal combustion engine using a support assembly. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gas that contains constituents, such as NOR, $N_2$, $CO_2$, and/or $H_2O$. In some applications, an exhaust gas aftertreatment system is utilized to dose the exhaust gas with a reductant so as to reduce NOR emissions in the exhaust gas. These exhaust gas aftertreatment systems may include a module within which the exhaust gas is routed. The module may provide reductant to the exhaust gas and facilitate mixing of the reductant and the exhaust gas within the module. The module may be mounted to, or in proximity to, an internal combustion engine.

Where the module is mounted in proximity to the internal combustion engine, the module requires additional physical space that would otherwise not be occupied by the internal combustion engine. As a result, the module can only be used in certain applications where the additional physical space is available. Furthermore, the consumption of this additional physical space may cause the internal combustion engine to be undesirable.

Where the module is mounted to the internal combustion engine, the module may hang from a side (e.g., left side, right side, front side, back side) of the internal combustion engine. This may cause horizontal (e.g., left to right, right to left) or lateral (e.g., front to back, back to front) shifting of the center of gravity of the internal combustion engine. As a result, the internal combustion engine may be subjected to increased vibrations. These vibrations may be transmitted to the module and cause the module to be undesirable. Additionally, heat produced by the engine may be transmitted to the module, thereby making the module undesirable.

Implementations described herein are directed to an exhaust gas aftertreatment module support assembly for supporting an exhaust gas aftertreatment module above a cylinder head and a cylinder block of an internal combustion engine. The exhaust gas aftertreatment module support assembly includes mounting brackets, each being coupled to the cylinder block. The exhaust gas aftertreatment support assembly also includes a cradle assembly that is selectively coupled to each of the mounting brackets. The cradle assembly includes cradle brackets, each having a cradle surface that interfaces with (e.g., is in contact with, etc.) the exhaust gas aftertreatment module such that the exhaust gas aftertreatment module rests upon the cradle surface. The cradle assembly also includes rails extending between the two cradle brackets. The cradle assembly further includes isolators, each located on one end of the cradle assembly and each interfacing with one of the mounting brackets. The isolators function to mitigate the transmission of vibrations to the cradle brackets and therefore to the exhaust gas aftertreatment module.

The cradle assembly and mounting brackets described herein cooperate to support the exhaust gas aftertreatment module above, and spaced apart from, the cylinder head. As a result, an air flow is created between the exhaust gas aftertreatment module and the cylinder head. This airflow facilitates cooling of the isolators and further mitigates transmission of vibrations to the exhaust gas aftertreatment module.

The cradle assembly and mounting brackets described herein also cooperate to facilitate rapid and simple removal of the exhaust gas aftertreatment module from the cylinder block. Specifically, fasteners extending through the isolators and into the mounting brackets may be removed and the exhaust gas aftertreatment module lifted off. Once the exhaust gas aftertreatment module is removed, the cylinder head may be serviced without removing the mounting brackets, thereby improving the serviceability of the internal combustion engine.

II. Example Exhaust Gas Aftertreatment System

FIG. 1 depicts an exhaust gas aftertreatment system 100 (e.g., single module exhaust gas aftertreatment system, etc.) for an internal combustion engine 101 (e.g., prime mover, etc.). In various embodiments, the internal combustion engine 101 is a diesel internal combustion engine. In other applications, the internal combustion engine 101 may a gasoline internal combustion engine, a hybrid internal combustion engine, a propane internal combustion engine, a natural gas internal combustion engine, or other similar internal combustion engines.

The exhaust gas aftertreatment system 100 includes an example reductant delivery system 102 for an exhaust gas conduit system 104. The exhaust gas aftertreatment system 100 also includes a particulate filter 106 (e.g., a diesel particulate filter (DPF)) and a selective catalytic reduction (SCR) catalyst member 108.

The particulate filter 106 is configured to remove particulate matter, such as soot, from exhaust gas flowing in the exhaust gas conduit system 104. The particulate filter 106 includes an inlet, where the exhaust gas is received, and an outlet, where the exhaust gas exits after having particulate matter substantially filtered from the exhaust gas and/or converting the particulate matter into carbon dioxide. In some implementations, the particulate filter 106 may be omitted.

The reductant delivery system 102 includes a decomposition chamber 110 (e.g., decomposition reactor, reactor pipe, decomposition tube, reactor tube, etc.). The decomposition chamber 110 is configured to convert a reductant into ammonia. The reductant may be, for example, urea, diesel exhaust fluid (DEF), Adblue®, a urea water solution (UWS), an aqueous urea solution (e.g., AUS32, etc.), and other similar fluids. The decomposition chamber 110 includes an inlet fluidly coupled to (e.g., fluidly configured to communicate with, etc.) the particulate filter 106 to receive the exhaust gas containing $NO_x$ emissions and an outlet for the exhaust gas, $NO_x$ emissions, ammonia, and/or reductant to flow to the SCR catalyst member 108.

The reductant delivery system 102 also includes a dosing module 112 (e.g., doser, etc.) configured to dose the reductant into the decomposition chamber 110. The dosing module 112 may include an insulator interposed between a portion of the dosing module 112 and the portion of the decomposition chamber 110 on which the dosing module 112 is mounted.

The dosing module 112 is fluidly coupled to a reductant source 114. The reductant source 114 may include multiple reductant sources 114. The reductant source 114 may be, for example, a diesel exhaust fluid tank containing Adblue®. A reductant pump 116 (e.g., supply unit, etc.) is used to pressurize the reductant from the reductant source 114 for delivery to the dosing module 112. In some embodiments, the reductant pump 116 is pressure controlled (e.g., controlled to obtain a target pressure, etc.). The reductant pump 116 includes a reductant filter 118. The reductant filter 118 filters (e.g., strains, etc.) the reductant prior to the reductant being provided to internal components (e.g., pistons, vanes, etc.) of the reductant pump 116. For example, the reductant filter 118 may inhibit or prevent the transmission of solids (e.g., solidified reductant, contaminants, etc.) to the internal components of the reductant pump 116. In this way, the reductant filter 118 may facilitate prolonged desirable operation of the reductant pump 116. In some embodiments, the reductant pump 116 is coupled to (e.g., attached to, fixed to, welded to, integrated with, etc.) a chassis of a vehicle associated with the exhaust gas aftertreatment system 100.

The dosing module 112 includes at least one injector 120. Each injector 120 is configured to dose the reductant into the exhaust gas (e.g., within the decomposition chamber 110, etc.). In some embodiments, the reductant delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the dosing module 112 via a conduit. In these embodiments, the dosing module 112 is configured to mix the air and the reductant into an air-reductant mixture and to provide the air-reductant mixture into the decomposition chamber 110. In other embodiments, the reductant delivery system 102 does not include the air pump 122 or the air source 124. In such embodiments, the dosing module 112 is not configured to mix the reductant with air.

The dosing module 112 and the reductant pump 116 are also electrically or communicatively coupled to a reductant delivery system controller 128. The reductant delivery system controller 128 is configured to control the dosing module 112 to dose the reductant into the decomposition chamber 110. The reductant delivery system controller 128 may also be configured to control the reductant pump 116.

The reductant delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the reductant delivery system controller 128 can read instructions. The instructions may include code from any suitable programming language. The memory 134 may include various modules that include instructions which are configured to be implemented by the processor 132.

In various embodiments, the reductant delivery system controller 128 is configured to communicate with a central controller 136 (e.g., engine control unit (ECU), engine control module (ECM), etc.) of the internal combustion engine 101. In some embodiments, the central controller 136 and the reductant delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 136. By changing state, the display device may provide an indication to a user (e.g., operator, etc.) of a status (e.g., operation, in need of service, etc.) of the reductant delivery system 102.

The decomposition chamber 110 is located upstream of the SCR catalyst member 108. As a result, the reductant is injected by the injector 120 upstream of the SCR catalyst member 108 such that the SCR catalyst member 108 receives a mixture of the reductant and exhaust gas. The reductant droplets undergo the processes of evaporation, thermolysis, and hydrolysis to form non-$NO_x$ emissions (e.g., gaseous ammonia, etc.) within the decomposition chamber 110, the SCR catalyst member 108, and/or the exhaust gas conduit system 104.

The SCR catalyst member 108 is configured to assist in the reduction of $NO_x$ emissions by accelerating a $NO_x$ reduction process between the reductant and the $NO_x$ of the exhaust gas into diatomic nitrogen, water, and/or carbon dioxide. The SCR catalyst member 108 includes an inlet fluidly coupled to the decomposition chamber 110 from which exhaust gas and reductant are received and an outlet fluidly coupled to an end of the exhaust gas conduit system 104.

The exhaust gas aftertreatment system 100 may further include an oxidation catalyst (e.g., a diesel oxidation catalyst (DOC)) fluidly coupled to the exhaust gas conduit system 104 (e.g., downstream of the SCR catalyst member 108 or upstream of the particulate filter 106) to oxidize hydrocarbons and carbon monoxide in the exhaust gas.

In some implementations, the particulate filter 106 may be positioned downstream of the decomposition chamber 110. For instance, the particulate filter 106 and the SCR catalyst member 108 may be combined into a single unit. In some implementations, the dosing module 112 may instead be positioned downstream of a turbocharger or upstream of a turbocharger.

III. Example Exhaust Gas Aftertreatment Module Support Assembly

FIGS. 2 and 4-10 illustrate an example exhaust gas aftertreatment system 200 and the internal combustion engine 201, according to an example embodiment. The exhaust gas aftertreatment system 200 includes an exhaust gas aftertreatment module 203 (e.g., single-module aftertreatment system, etc.). The exhaust gas aftertreatment module 203 includes several components of the exhaust gas aftertreatment system 200. For example, the exhaust gas aftertreatment module 203 may include the particulate filter 106, the SCR catalyst member 108, and/or the decomposition chamber 110. Other components of the exhaust gas aftertreatment system 200 may be coupled to the exhaust gas aftertreatment module 203. For example, the dosing module 112 may be coupled to the exhaust gas aftertreatment module 203.

The exhaust gas aftertreatment module 203 includes an inlet endcap 204 (e.g., first endcap, etc.). The inlet endcap 204 may include one or more components of the exhaust gas aftertreatment system 200. For example, the inlet endcap 204 may contain the particulate filter 106. The inlet endcap 204 includes an inlet endcap wall 205 (e.g., shell, etc.). The inlet endcap wall 205 is generally cylindrical. The inlet endcap 204 also includes an inlet endcap inlet 206 (e.g., intake, etc.) that is configured to receive the exhaust gas from the exhaust gas conduit system 104 (e.g., downstream of an exhaust manifold of the internal combustion engine 201, downstream of the particulate filter 106, etc.). The inlet endcap inlet 206 is selectively coupled to the exhaust gas conduit system 104.

The exhaust gas aftertreatment module 203 also includes a body 208. The body 208 may include one or more components of the exhaust gas aftertreatment system 200. For example, the body 208 may contain the SCR catalyst member 108 and/or the decomposition chamber 110. The body 208 is generally cylindrical.

The body 208 includes a first body end 210 (e.g., inlet end, etc.). The first body end 210 is coupled to the inlet endcap wall 205. The first body end 210 is configured to receive the exhaust gas from the inlet endcap 204 and provide the exhaust gas into the body 208. The first body end 210 is generally cylindrical.

The body 208 also includes a second body end 212 (e.g., inlet end, etc.). The second body end 212 is coupled to an outlet endcap wall 214 (e.g., shell, etc.) of an outlet endcap 216 (e.g., second endcap, etc.). The second body end 212 is configured to receive the exhaust gas from the body 208 and provide the exhaust gas into the outlet endcap 216. The second body end 212 is generally cylindrical.

The outlet endcap 216 may include one or more components of the exhaust gas aftertreatment system 200. For example, the outlet endcap 216 may contain the SCR catalyst member 108 and/or the decomposition chamber 110. The outlet endcap wall 214 is generally cylindrical. The outlet endcap 216 also includes an outlet endcap outlet 218 (e.g., intake, etc.) that is configured to provide the exhaust gas to the exhaust gas conduit system 104 (e.g., upstream of a tailpipe of the exhaust gas conduit system 104, etc.). The outlet endcap outlet 218 is selectively coupled to the exhaust gas conduit system 104.

The body 208 is centered on a body axis 220 (e.g., center axis, etc.). In various embodiments, the inlet endcap wall 205 is centered on the body axis 220 and/or the outlet endcap wall 214 is centered on the body axis 220. The inlet endcap inlet 206 is centered on an inlet endcap axis. The inlet endcap axis may be orthogonal (e.g., normal, etc.) to the body axis 220. The outlet endcap outlet 218 is centered on an outlet endcap axis. The outlet endcap axis may be orthogonal to the body axis 220. The outlet endcap axis may be orthogonal to the body axis 220 and orthogonal to the inlet endcap axis. The relationship between the inlet endcap axis and the outlet endcap axis is related to a packing of the exhaust gas aftertreatment system 200. By changing this relationship, the space consumed by the exhaust gas aftertreatment system 200 can be minimized for a particular configuration of the internal combustion engine 201.

The exhaust gas aftertreatment system 200 includes an exhaust gas aftertreatment module support assembly 222. The exhaust gas aftertreatment module support assembly 222 is selectively coupled to the exhaust gas aftertreatment module 203 and the internal combustion engine 201.

The exhaust gas aftertreatment module support assembly 222 does not support the exhaust gas aftertreatment module 203 over a side of the internal combustion engine 201. Instead, the exhaust gas aftertreatment module support assembly 222 supports the exhaust gas aftertreatment module 203 above, and spaced apart from, the internal combustion engine 201 when measured along a vertical direction (e.g., the Z-axis, etc.) relative to a surface 224 (e.g., chassis, ground, etc.) to which the internal combustion engine 201 is coupled. In this way, the exhaust gas aftertreatment module 203 is mounted to the internal combustion engine 201 without substantially increasing (e.g., increasing by more than 5%, etc.) the physical footprint of the internal combustion engine 201 along the surface 224 in a horizontal direction (e.g., a direction orthogonal to the vertical direction, the X-axis, etc.) and/or a lateral direction (e.g., a direction orthogonal to the vertical direction and the horizontal direction, the Y-axis, etc.).

The exhaust gas aftertreatment module support assembly 222 supports the exhaust gas aftertreatment module 203 above, and spaced apart from, the internal combustion engine 201 such that the body axis 220 is separated from (e.g., spaced apart from, etc.) the surface 224 a target distance. According to various embodiments, this target distance is substantially equal (e.g., within 5% of, etc.) to 47.28 inches. In other embodiments, this target distance is substantially equal to 51.65 inches. In other embodiments, this target distance is substantially equal to 43.46 inches. In various embodiments, this target distance is between 40 inches and 60 inches, inclusive (e.g., 40 inches, 42 inches, 45 inches, 50 inches, 54 inches, 60 inches, etc.).

Additionally, the exhaust gas aftertreatment module support assembly 222 supports the exhaust gas aftertreatment module 203 above, and spaced apart from, the internal combustion engine 201 such that the body 208 is separated from a top surface of the internal combustion engine 201 (e.g., a top surface of a cylinder head of the internal combustion engine 201, etc.) by a target spacing. In a particular embodiment, this target spacing is substantially equal to 0.72 inches, although the spacing amount may vary. This target spacing is present along the body axis 220 (e.g., rather than being present along only a portion of the body axis 220 where the target spacing is not present along other portions of the body axis 220, etc.). In various embodiments, this target spacing is between 0.1 inches and 10 inches, inclusive (e.g., 0.1 inches, 1 inch, 3.5 inches, 6 inches, 8 inches, 10 inches, etc.).

By being located above the internal combustion engine 201, the center of gravity of the internal combustion engine may be vertically aligned with the center of gravity of the exhaust gas aftertreatment module 203. As a result, stresses and strains due to vibrations may be decreased. Additionally, the exhaust gas aftertreatment module support assembly 222 may be configured such that the center of gravity of the exhaust gas aftertreatment module 203 is brought into close proximity with the center of gravity of the internal combustion engine 201. This may also decrease stresses and strains due to vibrations.

Figure 3:
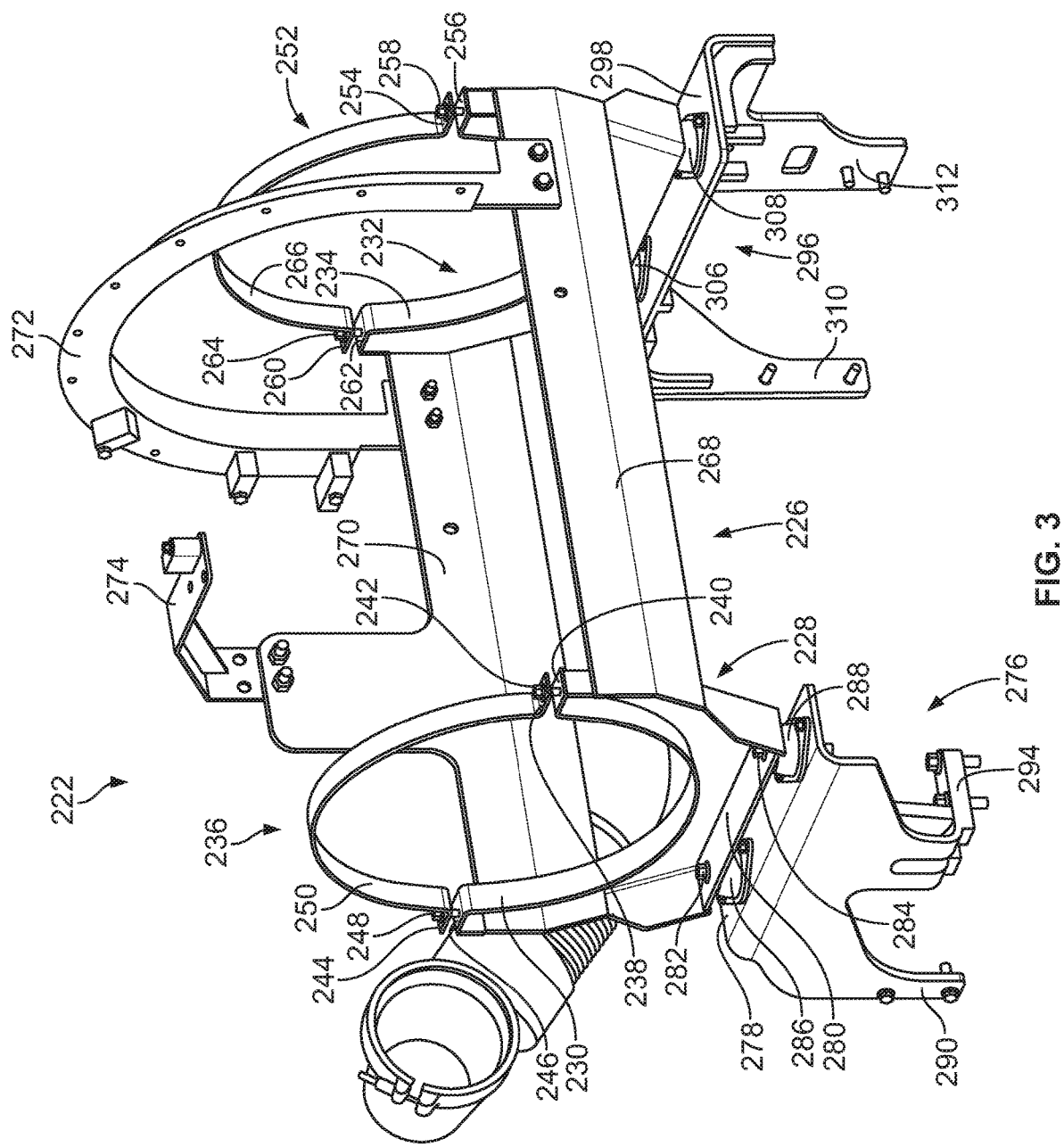
FIG. 3 is a perspective view of the exhaust gas aftertreatment module support assembly shown in FIG. 2.
Figure 4:
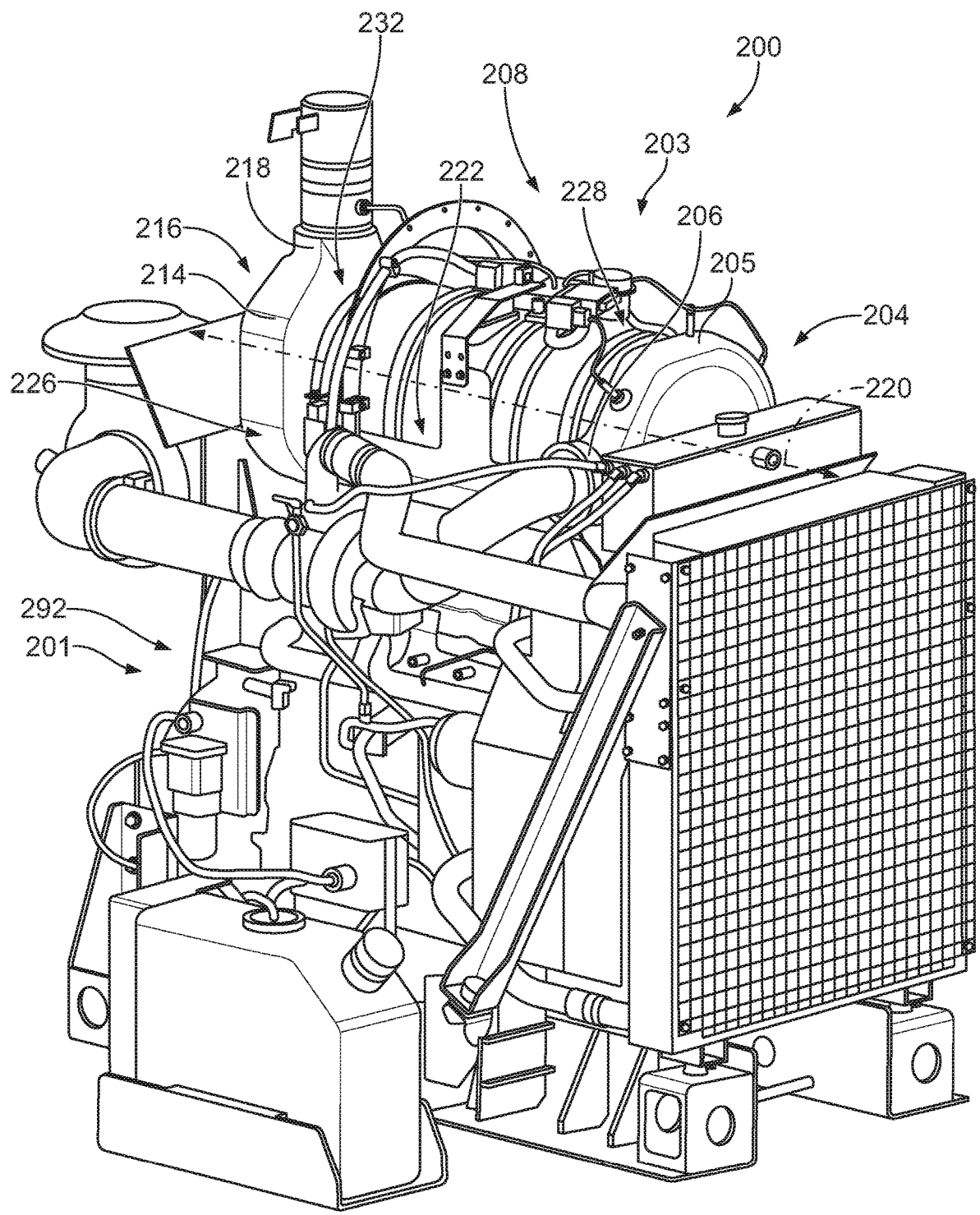
FIG. 4 is another perspective view of the internal combustion engine and exhaust gas aftertreatment system shown in FIG. 2.
Figure 5:
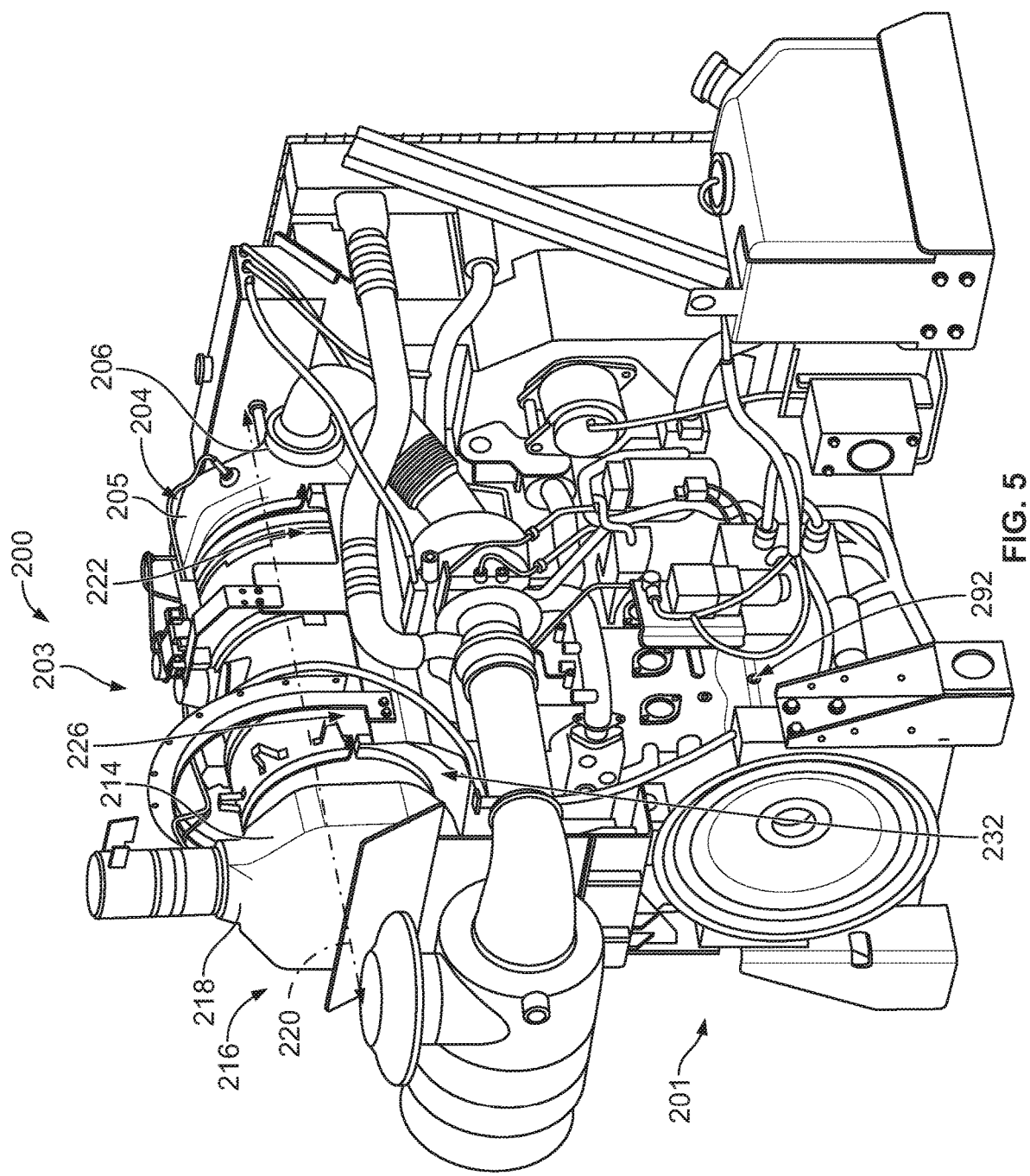
FIG. 5 is another perspective view of the internal combustion engine and exhaust gas aftertreatment system shown in FIG. 2.

FIG. 3 illustrates the exhaust gas aftertreatment module support assembly 222 with portions of the exhaust gas aftertreatment system 200 hidden and with the internal combustion engine 201 hidden. As is explained in more detail herein, the exhaust gas aftertreatment module support assembly 222 facilitates use (e.g., operation, servicing, etc.), installation (e.g., insertion, servicing, replacement, etc.), and uninstallation (e.g., removal, servicing, replacement, etc.) of at least one of the internal combustion engine 201, the exhaust gas aftertreatment system 200, or the exhaust gas aftertreatment module 203.

Figure 2:
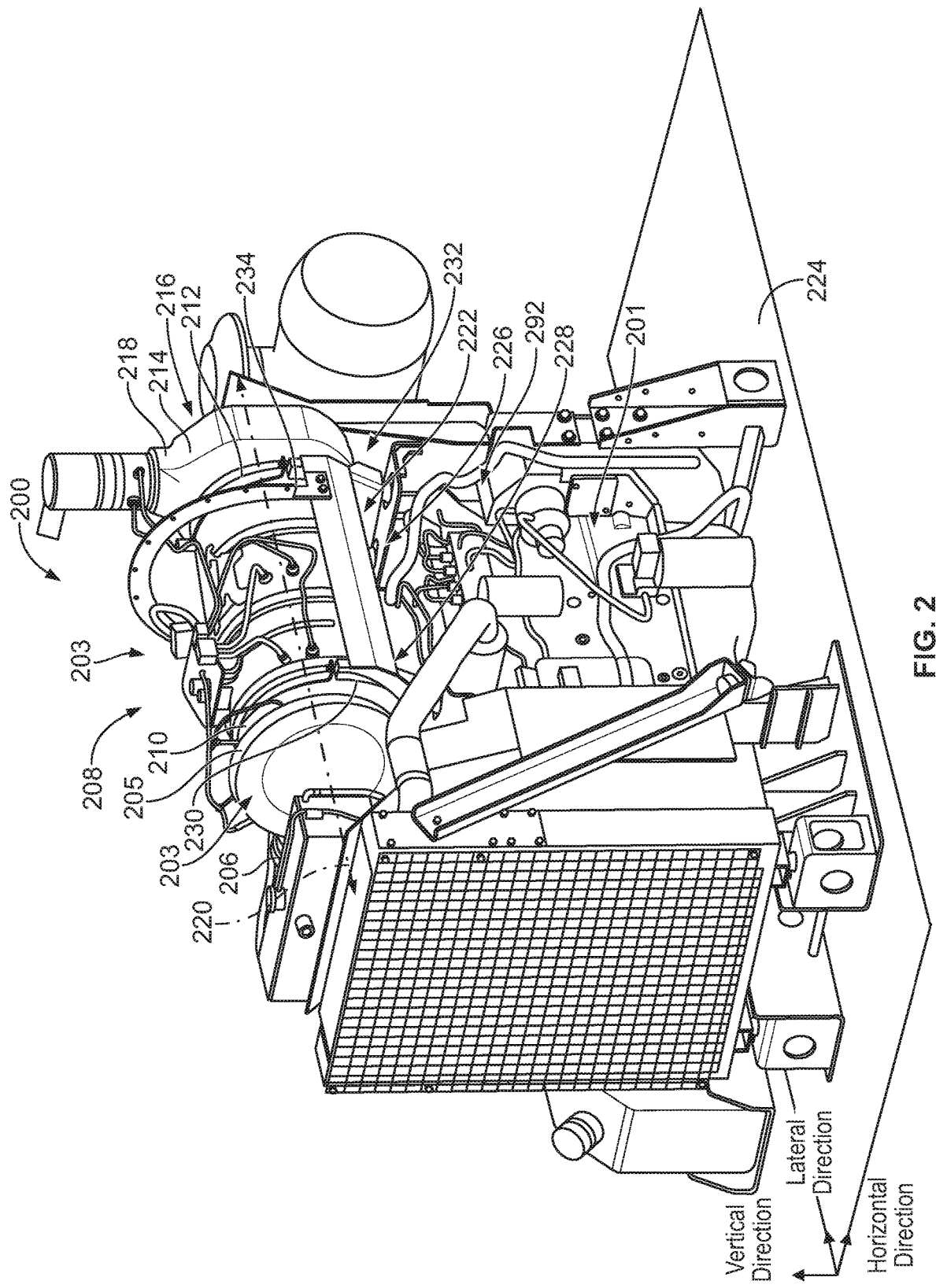
FIG. 2 is a perspective view of an internal combustion engine and an exhaust gas aftertreatment system having an exhaust gas aftertreatment module and an exhaust gas aftertreatment module support assembly, according to an example embodiment.

As shown in FIG. 2, for example, the exhaust gas aftertreatment module support assembly 222 includes a cradle assembly 226. The cradle assembly 226 includes a first cradle bracket 228. The first cradle bracket 228 includes a first cradle bracket cradle surface 230 (e.g., face, etc.). The first cradle bracket cradle surface 230 interfaces with (e.g., is in contact with, etc.) the first body end 210 and supports the exhaust gas aftertreatment module 203 above the internal combustion engine 201. In various embodiments, the first cradle bracket cradle surface 230 is at least partially disposed along a circular arc having a radius $R_1$ substantially equal to a radius $R_{B1}$ of the first body end 210 (e.g., $R_1=R_{B1}$, $R_1=1.05R_{B1}$, $R_1=0.95R_{B1}$, etc.). In various embodiments, the circular arc along which the first cradle bracket cradle surface 230 is at least partially disposed subtends an angle of between 110 degrees and 230 degrees, inclusive. In one embodiment, the circular arc along which the first cradle bracket cradle surface 230 is at least partially disposed subtends an angle of 180 degrees. In some embodiments, the first cradle bracket cradle surface 230 includes discontinuities (e.g., gaps, etc.). In some embodiments, the first cradle bracket cradle surface 230 is flat.

The cradle assembly 226 also includes a second cradle bracket 232. The second cradle bracket 232 includes a second cradle bracket cradle surface 234 (e.g., face, etc.). The second cradle bracket cradle surface 234 interfaces with the second body end 212 and supports the exhaust gas aftertreatment module 203 above the internal combustion engine 201. In various embodiments, the second cradle bracket cradle surface 234 is at least partially disposed along a circular arc having a radius $R_2$ substantially equal to a radius $R_{B2}$ of the second body end 212 (e.g., $R_2=R_{B2}$, $R_2=1.05R_{B2}$, $R_2=0.95R_{B2}$, etc.). In various embodiments, the circular arc along which the second cradle bracket cradle surface 234 is at least partially disposed subtends an angle of between 110 degrees and 230 degrees, inclusive. In one embodiment, the circular arc along which the second cradle bracket cradle surface 234 is at least partially disposed subtends an angle of 180 degrees. In some embodiments, the second cradle bracket cradle surface 234 includes discontinuities (e.g., gaps, etc.). In some embodiments, the $R_2$ is equal to the $R_1$. In some embodiments, the second cradle bracket 232 is identical to the first cradle bracket 228. In some embodiments, the first cradle bracket cradle surface 230 is flat.

The cradle assembly 226 also includes a first cradle band 236 (e.g., strap, member, latch, etc.). The first cradle band 236 includes a first cradle band first end 238 (e.g., portion, etc.). The first cradle band first end 238 is selectively coupled to a first cradle bracket first flange 240 (e.g., shelf, platform, etc.) of the first cradle bracket 228 using a first cradle band first fastener 242 (e.g., screw, bolt, clamp, etc.). The first cradle bracket first flange 240 is contiguous with the first cradle bracket cradle surface 230. In various embodiments, the first cradle bracket first flange 240 is disposed along a plane that is substantially parallel to a plane upon which the surface 224 is disposed.

The first cradle band 236 also includes a first cradle band second end 244 (e.g., portion, etc.). The first cradle band second end 244 is selectively coupled to a first cradle bracket second flange 246 (e.g., shelf, platform, etc.) of the first cradle bracket 228 using a first cradle band second fastener 248 (e.g., screw, bolt, clamp, etc.). The first cradle bracket second flange 246 is contiguous with the first cradle bracket cradle surface 230. In various embodiments, the first cradle bracket second flange 246 is disposed along a plane that is substantially parallel to a plane upon which the surface 224 is disposed.

The first cradle band 236 also includes a first cradle band cradle surface 250 (e.g., face, etc.). The first cradle band cradle surface 250 interfaces with the first body end 210 and retains the exhaust gas aftertreatment module 203 relative to the internal combustion engine 201. The first cradle band cradle surface 250 is at least partially disposed along a circular arc having a radius $R_3$ substantially equal to (e.g., within 5% of, etc.) the $R_{B1}$ (e.g., $R_3=R_{B1}$, $R_3=1.05R_{B1}$, $R_3=0.95R_{B1}$, etc.). In various embodiments, the circular arc along which the first cradle band cradle surface 250 is at least partially disposed subtends an angle of between 110 degrees and 230 degrees, inclusive. In one embodiment, the circular arc along which the first cradle band cradle surface 250 is at least partially disposed subtends an angle of 180 degrees. In some embodiments, the first cradle band cradle surface 250 includes discontinuities (e.g., gaps, etc.). In some embodiments, the $R_3$ is equal to the $R_1$.

The cradle assembly 226 also includes a second cradle band 252 (e.g., strap, member, latch, etc.). The second cradle band 252 includes a second cradle band first end 254 (e.g., portion, etc.). The second cradle band first end 254 is selectively coupled to a second cradle bracket first flange 256 (e.g., shelf, platform, etc.) of the second cradle bracket 232 using a second cradle band first fastener 258 (e.g., screw, bolt, clamp, etc.). The second cradle bracket first flange 256 is contiguous with the second cradle bracket cradle surface 234. In various embodiments, the second cradle bracket first flange 256 is disposed along a plane that is substantially parallel to a plane upon which the surface 224 is disposed.

The second cradle band 252 also includes a second cradle band second end 260 (e.g., portion, etc.). The second cradle band second end 260 is selectively coupled to a second cradle bracket second flange 262 (e.g., shelf, platform, etc.) of the second cradle bracket 232 using a second cradle band second fastener 264 (e.g., screw, bolt, clamp, etc.). The second cradle bracket second flange 262 is contiguous with the second cradle bracket cradle surface 234. In various embodiments, the second cradle bracket second flange 262 is disposed along a plane that is substantially parallel to a plane upon which the surface 224 is disposed.

The second cradle band 252 also includes a second cradle band cradle surface 266 (e.g., face, etc.). The second cradle band cradle surface 266 interfaces with the second body end 212 and retains the exhaust gas aftertreatment module 203 relative to the internal combustion engine 201. The second cradle band cradle surface 266 is at least partially disposed along a circular arc having a radius $R_4$ substantially equal to (e.g., within 5% of, etc.) the $R_{B2}$ (e.g., $R_4 = R_{B2}$, $R_4 = 1.05 R_{B2}$, $R_4 = 0.95 R_{B2}$, etc.). In various embodiments, the circular arc along which the second cradle band cradle surface 266 is at least partially disposed subtends an angle of between 110 degrees and 230 degrees, inclusive. In one embodiment, the circular arc along which the second cradle band cradle surface 266 is at least partially disposed subtends an angle of 180 degrees. In some embodiments, the second cradle band cradle surface 266 includes discontinuities (e.g., gaps, etc.). In some embodiments, the $R_4$ is equal to the $R_2$. In some embodiments, the $R_4$ is equal to the $R_3$. In some embodiments, the second cradle band 252 is identical to the first cradle band 236.

The cradle assembly 226 also includes a first rail 268 (e.g., bar, etc.). The first rail 268 is coupled to the first cradle bracket 228 and the second cradle bracket 232. As a result, the first rail 268 extends between and separates the first cradle bracket 228 and the second cradle bracket 232.

The cradle assembly 226 also includes a second rail 270 (e.g., bar, etc.). The second rail 270 is coupled to the first cradle bracket 228 and the second cradle bracket 232. As a result, the second rail 270 extends between and separates the first cradle bracket 228 and the second cradle bracket 232. In various embodiments, the second rail 270 is parallel to the first rail 268.

As shown in FIG. 3, for example, the cradle assembly 226 also includes a mounting ring 272. The mounting ring 272 is coupled to the first rail 268 and the second rail 270 and extends over the body 208. Various lines and conduits, such as conduits for conveying reductant from the reductant pump 116 to the dosing module 112 and conduits for conveying air from the air pump 122 to the dosing module 112, may be coupled to the mounting ring 272. The mounting ring 272 is at least partially disposed along a circular arc having a radius $R_5$ greater than the $R_{B1}$, the $R_{B2}$, the $R_3$, or the $R_4$. In various embodiments, the circular arc along which the mounting ring 272 is at least partially disposed subtends an angle of between 110 degrees and 230 degrees, inclusive. In one embodiment, the circular arc along which the mounting ring 272 is at least partially disposed subtends an angle of 180 degrees. The mounting ring 272 may aid in maintaining these conduits in target locations during use, installation, and uninstallation of at least one of the internal combustion engine 201, the exhaust gas aftertreatment system 200, or the exhaust gas aftertreatment module 203. In various embodiments, the cradle assembly 226 does not include the mounting ring 272.

The cradle assembly 226 also includes a mounting arm 274. The mounting arm 274 is coupled to the second rail 270 and extends over the body 208. The mounting arm 274 is not coupled to the first rail 268. Various lines and conduits, such as conduits for conveying reductant from the reductant pump 116 to the dosing module 112 and conduits for conveying air from the air pump 122 to the dosing module 112, may be coupled to the mounting arm 274. The mounting arm 274 may aid in maintaining these conduits in target locations during use, installation, and uninstallation of at least one of the internal combustion engine 201, the exhaust gas aftertreatment system 200, or the exhaust gas aftertreatment module 203. In various embodiments, the cradle assembly 226 does not include the mounting arm 274.

Figure 6:
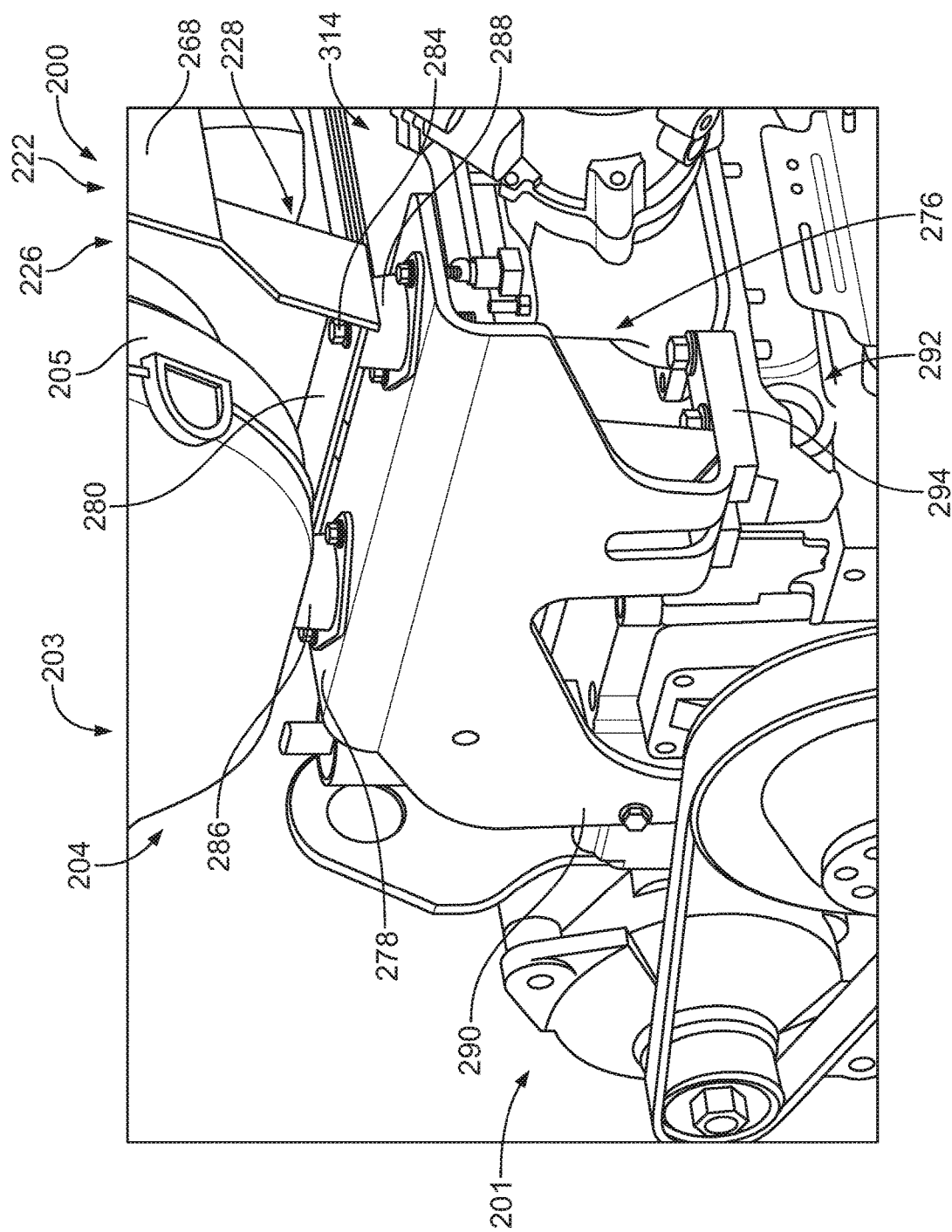
FIG. 6 is a detailed perspective view of the internal combustion engine and exhaust gas aftertreatment system shown in FIG. 2.

As shown in FIG. 6, for example, the exhaust gas aftertreatment module support assembly 222 also includes a first mounting bracket 276. The first mounting bracket 276 is coupled to the internal combustion engine 201 and the first cradle bracket 228. The first mounting bracket 276 includes a first mounting bracket first flange 278 (e.g., shelf, platform, etc.). The first mounting bracket first flange 278 is coupled to a first cradle bracket second flange 280 (e.g., shelf, platform, etc.) of the first cradle bracket 228 using a first mounting bracket first fastener 282 (e.g., screw, bolt, etc.) and a first mounting bracket second fastener 284 (e.g., screw, bolt, etc.). In various embodiments, the first mounting bracket first flange 278 is disposed along a plane which is parallel to a plane upon which the first cradle bracket second flange 280 is disposed.

The exhaust gas aftertreatment module support assembly 222 also includes a first mounting bracket first isolator 286 (e.g., bushing, spacer, damper, high capacity laminate elastomeric bearing, etc.) disposed between the first mounting bracket first flange 278 and the first cradle bracket second flange 280 and a first mounting bracket second isolator 288 (e.g., bushing, spacer, damper, high capacity laminate elastomeric bearing, etc.) disposed between the first mounting bracket first flange 278 and the first cradle bracket second flange 280. The first mounting bracket first isolator 286 and the first mounting bracket second isolator 288 each separate the first mounting bracket first flange 278 from the first cradle bracket second flange 280 and function to mitigate transmission of vibration, heat, and other energy between the first mounting bracket first flange 278 and the first cradle bracket second flange 280. In this way, the first mounting bracket first isolator 286 and the first mounting bracket second isolator 288 function to mitigate transmission of vibration, heat, and other energy from the internal combustion engine 201 to the exhaust gas aftertreatment module 203. In some embodiments, the first mounting bracket second isolator 288 is identical to the first mounting bracket first isolator 286.

In various embodiments, the first mounting bracket first fastener 282 extends through an aperture (e.g., hole, opening, etc.) in the first mounting bracket first isolator 286 and the first mounting bracket second fastener 284 extends through an aperture (e.g., hole, opening, etc.) in the first mounting bracket second isolator 288. In some of these embodiments, the first mounting bracket first isolator 286 is coupled to the first mounting bracket first flange 278, the first mounting bracket second isolator 288 is coupled to the first mounting bracket first flange 278, the first mounting bracket first isolator 286 is not coupled to the first cradle bracket second flange 280 (e.g., the first cradle bracket second flange 280 is separable from the first mounting bracket first isolator 286 without the use of tools, etc.), and the first mounting bracket second isolator 288 is not coupled to the first cradle bracket second flange 280 (e.g., the first cradle bracket second flange 280 is separable from the first mounting bracket second isolator 288 without the use of tools, etc.).

The first mounting bracket 276 also includes a first mounting bracket second flange 290 (e.g., shelf, platform, etc.). The first mounting bracket second flange 290 is configured to be coupled to a cylinder block 292 of the internal combustion engine 201 via fasteners (e.g., screws, bolts, clamps, etc.). In various embodiments, the first mounting bracket second flange 290 is disposed along a plane that is orthogonal to a plane upon which the first mounting bracket first flange 278 is disposed. This relationship between the first mounting bracket second flange 290 and the first mounting bracket first flange 278 accommodates coupling to the cylinder block 292 proximate a front of the internal combustion engine 201 and may provide increased strength and durability to the first mounting bracket 276. It is understood that in various applications, the first mounting bracket second flange 290 may be coupled to other engine structures instead of, or in addition to, the cylinder block 292.

The first mounting bracket 276 also includes a first mounting bracket third flange 294 (e.g., shelf, platform, etc.). The first mounting bracket third flange 294 is configured to be coupled to the cylinder block 292 via fasteners. In various embodiments, the first mounting bracket third flange 294 is disposed along a plane that is parallel to a plane upon which the first mounting bracket first flange 278 is disposed. It is understood that in various applications, the first mounting bracket third flange 294 may be coupled to other engine structures instead of, or in addition to, the cylinder block 292.

Figure 7:
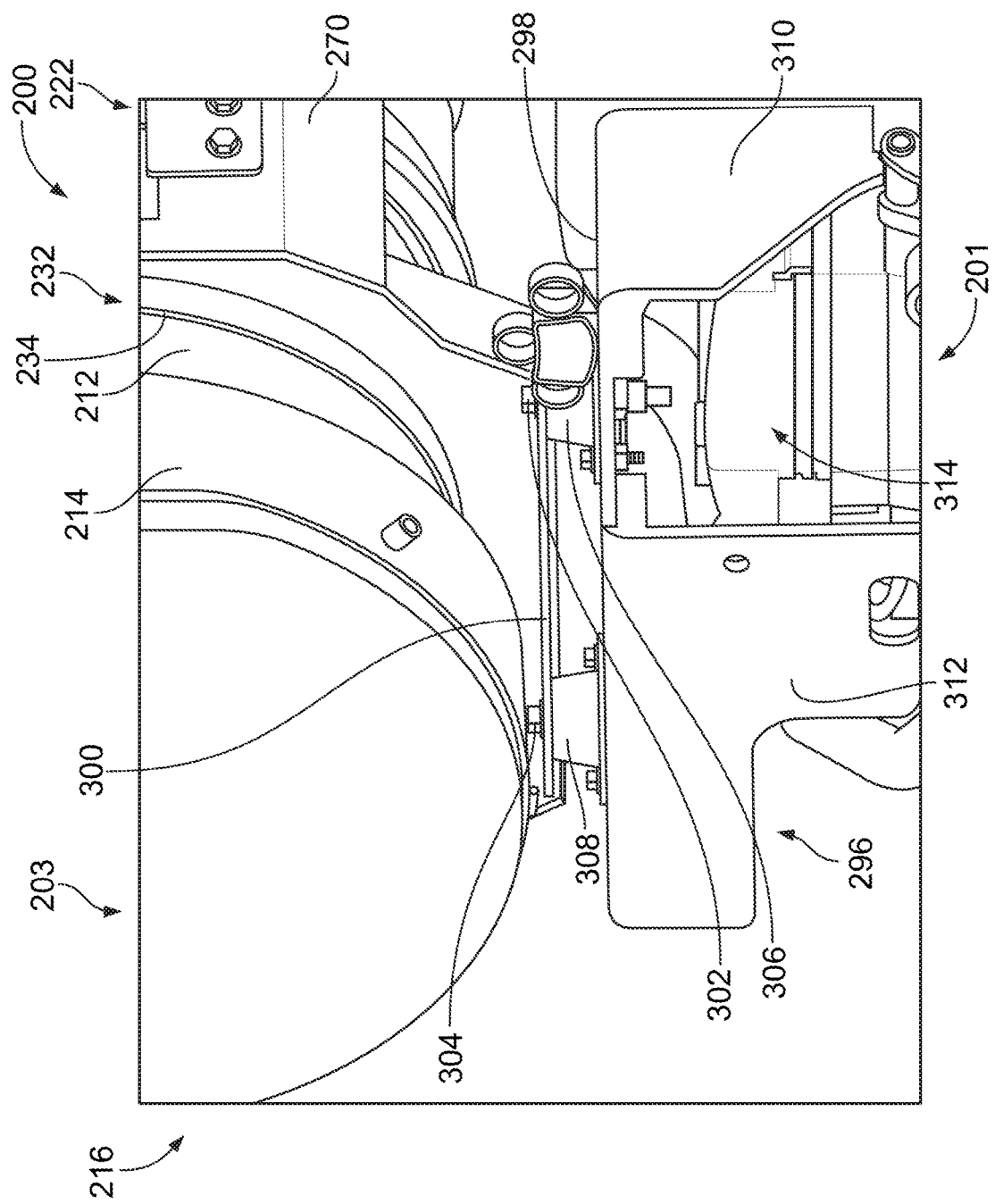
FIG. 7 is another detailed perspective view of the internal combustion engine and exhaust gas aftertreatment system shown in FIG. 2.

As shown in FIG. 7, for example, the exhaust gas aftertreatment module support assembly 222 also includes a second mounting bracket 296. The second mounting bracket 296 is coupled to the internal combustion engine 201 and the second cradle bracket 232. The second mounting bracket 296 includes a second mounting bracket first flange 298 (e.g., shelf, platform, etc.). The second mounting bracket first flange 298 is coupled to a second cradle bracket second flange 300 (e.g., shelf, platform, etc.) of the second cradle bracket 232 using a second mounting bracket first fastener 302 (e.g., screw, bolt, etc.) and a second mounting bracket second fastener 304 (e.g., screw, bolt, etc.). In various embodiments, the second mounting bracket first flange 298 is disposed along a plane which is parallel to a plane upon which the second cradle bracket second flange 300 is disposed.

The exhaust gas aftertreatment module support assembly 222 also includes a second mounting bracket first isolator 306 (e.g., bushing, spacer, damper, high capacity laminate elastomeric bearing, etc.) disposed between the second mounting bracket first flange 298 and the second cradle bracket second flange 300 and a second mounting bracket second isolator 308 (e.g., bushing, spacer, damper, high capacity laminate elastomeric bearing, etc.) disposed between the second mounting bracket first flange 298 and the second cradle bracket second flange 300. The second mounting bracket first isolator 306 and the second mounting bracket second isolator 308 each separate the second mounting bracket first flange 298 from the second cradle bracket second flange 300 and function to mitigate transmission of vibration, heat, and other energy between the second mounting bracket first flange 298 and the second cradle bracket second flange 300. In this way, the second mounting bracket first isolator 306 and the second mounting bracket second isolator 308 function to mitigate transmission of vibration, heat, and other energy from the internal combustion engine 201 to the exhaust gas aftertreatment module 203. In some embodiments, the second mounting bracket second isolator 308 is identical to the second mounting bracket first isolator 306. In some embodiments, the second mounting bracket second isolator 308, the second mounting bracket first isolator 306, the first mounting bracket second isolator 288, and the first mounting bracket first isolator 286 are identical.

In various embodiments, the second mounting bracket first fastener 302 extends through an aperture (e.g., hole, opening, etc.) in the second mounting bracket first isolator 306 and the second mounting bracket second fastener 304 extends through an aperture (e.g., hole, opening, etc.) in the second mounting bracket second isolator 308. In some of these embodiments, the second mounting bracket first isolator 306 is coupled to the second mounting bracket first flange 298, the second mounting bracket second isolator 308 is coupled to the second mounting bracket first flange 298, the second mounting bracket first isolator 306 is not coupled to the second cradle bracket second flange 300 (e.g., the second cradle bracket second flange 300 is separable from the second mounting bracket first isolator 306 without the use of tools, etc.), and the second mounting bracket second isolator 308 is not coupled to the second cradle bracket second flange 300 (e.g., the second cradle bracket second flange 300 is separable from the second mounting bracket second isolator 308 without the use of tools, etc.).

The first mounting bracket first isolator 286, the first mounting bracket second isolator 288, the second mounting bracket first isolator 306, and the second mounting bracket second isolator 308 separate the cradle assembly 226 from the first mounting bracket 276 and the second mounting bracket 296 and thereby create a channel for air flow between a top surface of the internal combustion engine 201 and the body 208 within which the first mounting bracket first isolator 286, the first mounting bracket second isolator 288, the second mounting bracket first isolator 306, and the second mounting bracket second isolator 308 are located. Air flowing through this channel functions to cool the first mounting bracket first isolator 286, the first mounting bracket second isolator 288, the second mounting bracket first isolator 306, and the second mounting bracket second isolator 308 so as to mitigate thermal degradation, stress, and/or fatigue on the first mounting bracket first isolator 286, the first mounting bracket second isolator 288, the second mounting bracket first isolator 306, and the second mounting bracket second isolator 308. The first mounting bracket 276 and second mounting bracket 296 may be located so that this channel is aligned with a radiator and/or fan of the internal combustion engine 201. In this way, additional air may be caused to flow against the first mounting bracket first isolator 286, the first mounting bracket second isolator 288, the second mounting bracket first isolator 306, and the second mounting bracket second isolator 308, thereby providing additional cooling to the first mounting bracket first isolator 286, the first mounting bracket second isolator 288, the second mounting bracket first isolator 306, and the second mounting bracket second isolator 308.

The second mounting bracket 296 also includes a second mounting bracket second flange 310 (e.g., shelf, platform, etc.). The second mounting bracket second flange 310 is configured to be coupled to the cylinder block 292 via fasteners. In various embodiments, the second mounting bracket second flange 310 is disposed along a plane that is orthogonal to a plane upon which the second mounting bracket first flange 298 is disposed. It is understood that in various applications, the second mounting bracket second flange 310 may be coupled to other engine structures instead of, or in addition to, the cylinder block 292.

The second mounting bracket 296 also includes a second mounting bracket third flange 312 (e.g., shelf, platform, etc.). The second mounting bracket third flange 312 is configured to be coupled to the cylinder block 292 via fasteners. In various embodiments, the second mounting bracket third flange 312 is disposed along a plane that is orthogonal to a plane upon which the second mounting bracket first flange 298 is disposed and a plane upon which the second mounting bracket second flange 310 is disposed. It is understood that in various applications, the second mounting bracket third flange 312 may be coupled to other engine structures instead of, or in addition to, the cylinder block 292.

Figure 12:
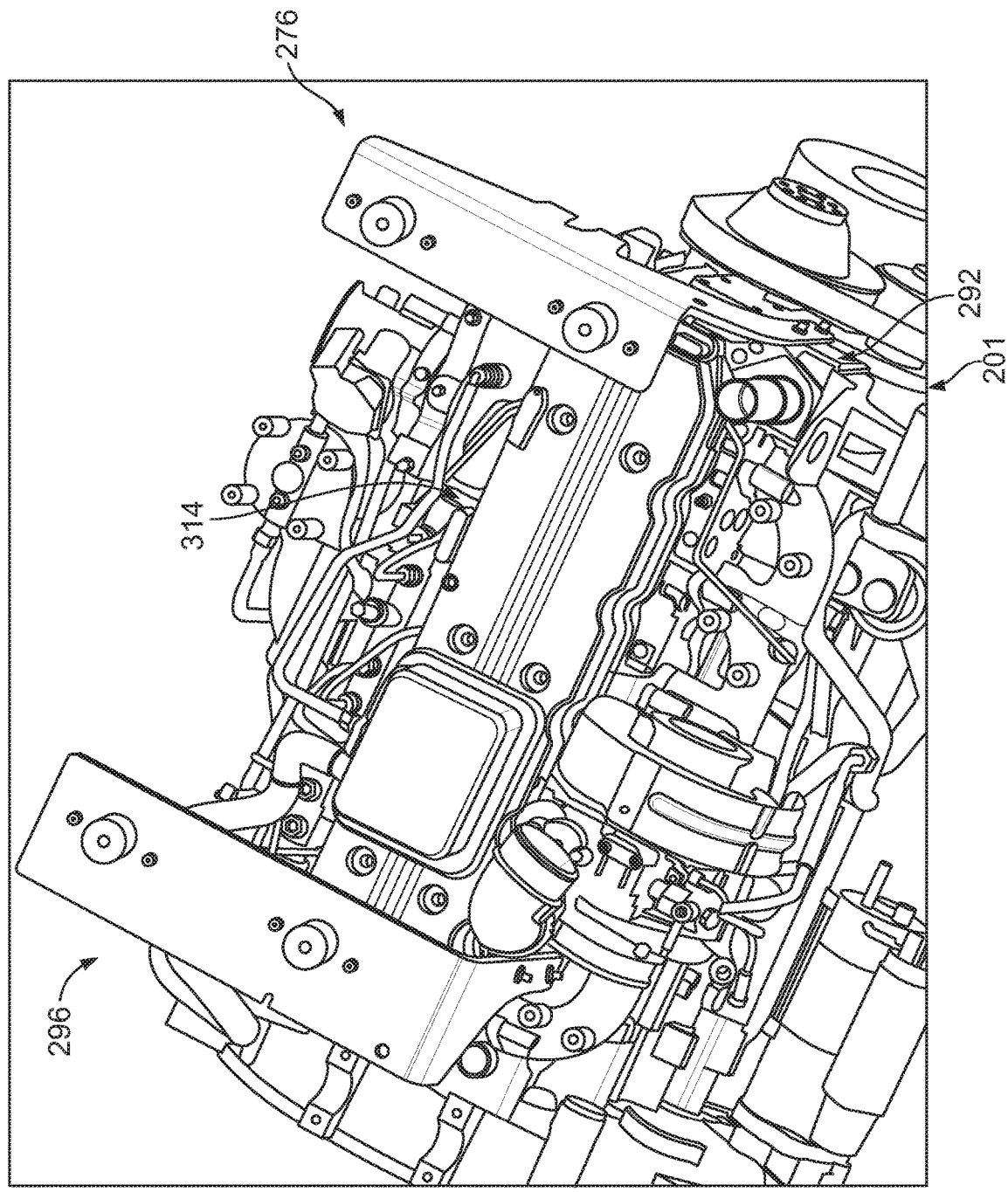
FIG. 12 is another perspective view of the internal combustion engine and exhaust gas aftertreatment system shown in FIG. 2.

As shown in FIG. 12, for example, the first mounting bracket 276 and the second mounting bracket 296 are coupled to the cylinder block 292 such that a cylinder head 314 of the internal combustion engine 201 is located between the first mounting bracket 276 and the second mounting bracket 296, and therefore between the first cradle bracket 228 and the second cradle bracket 232. As a result, the first rail 268 and the second rail 270, and therefore the body 208, extend across the cylinder head 314.

Figure 8:
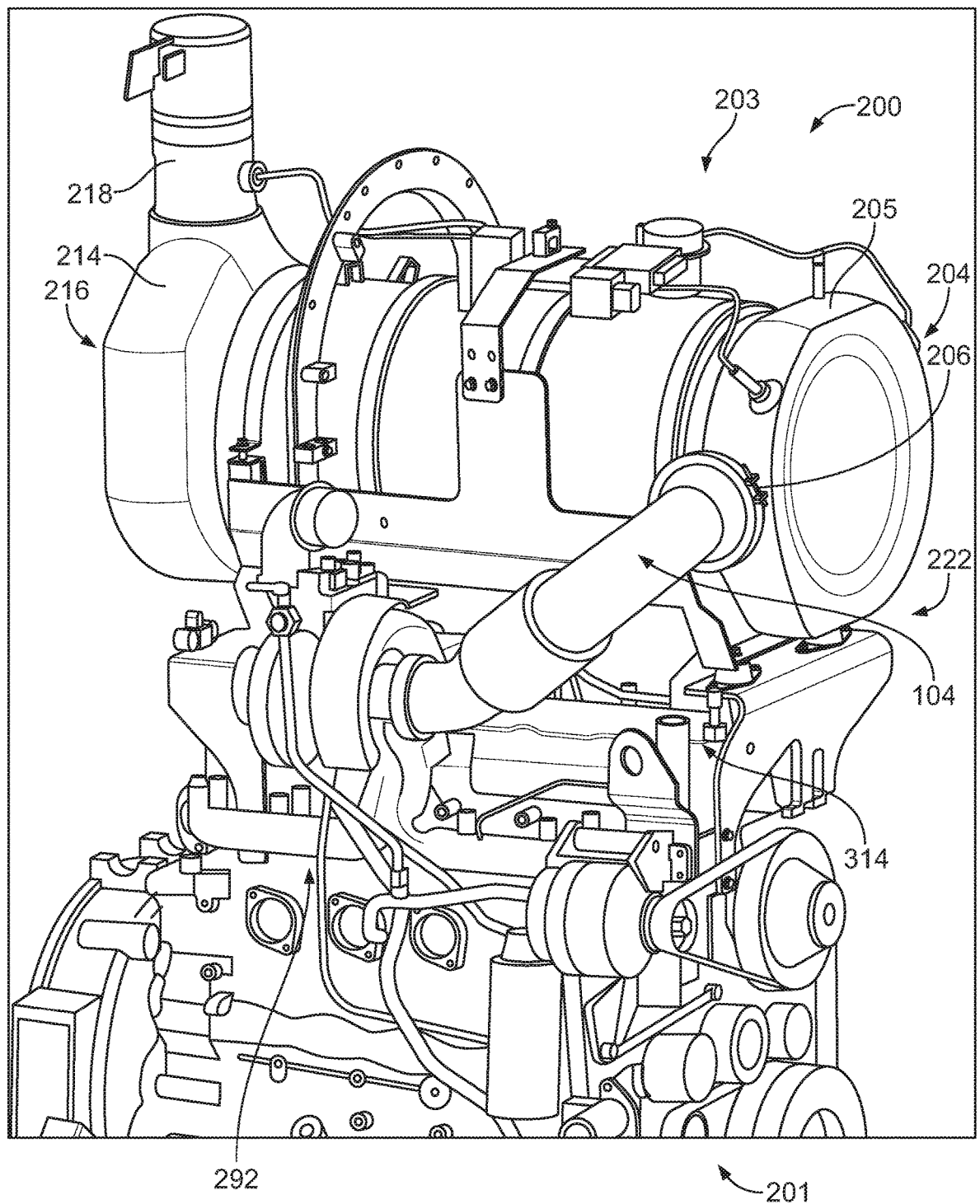
FIG. 8 is another perspective view of the internal combustion engine and exhaust gas aftertreatment system shown in FIG. 2.
Figure 9:
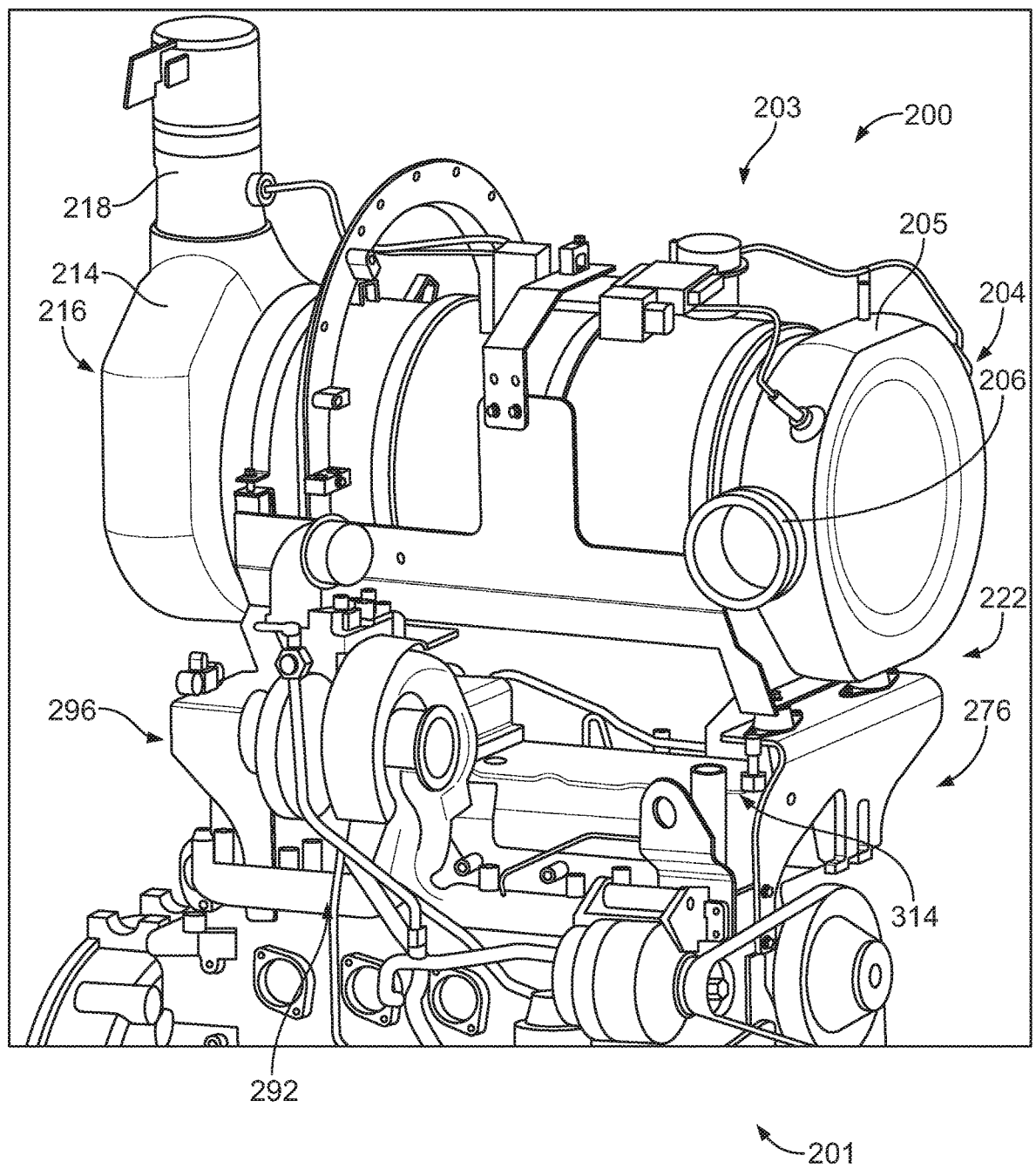
FIG. 9 is another perspective view of the internal combustion engine and exhaust gas aftertreatment system shown in FIG. 2.
Figure 10:
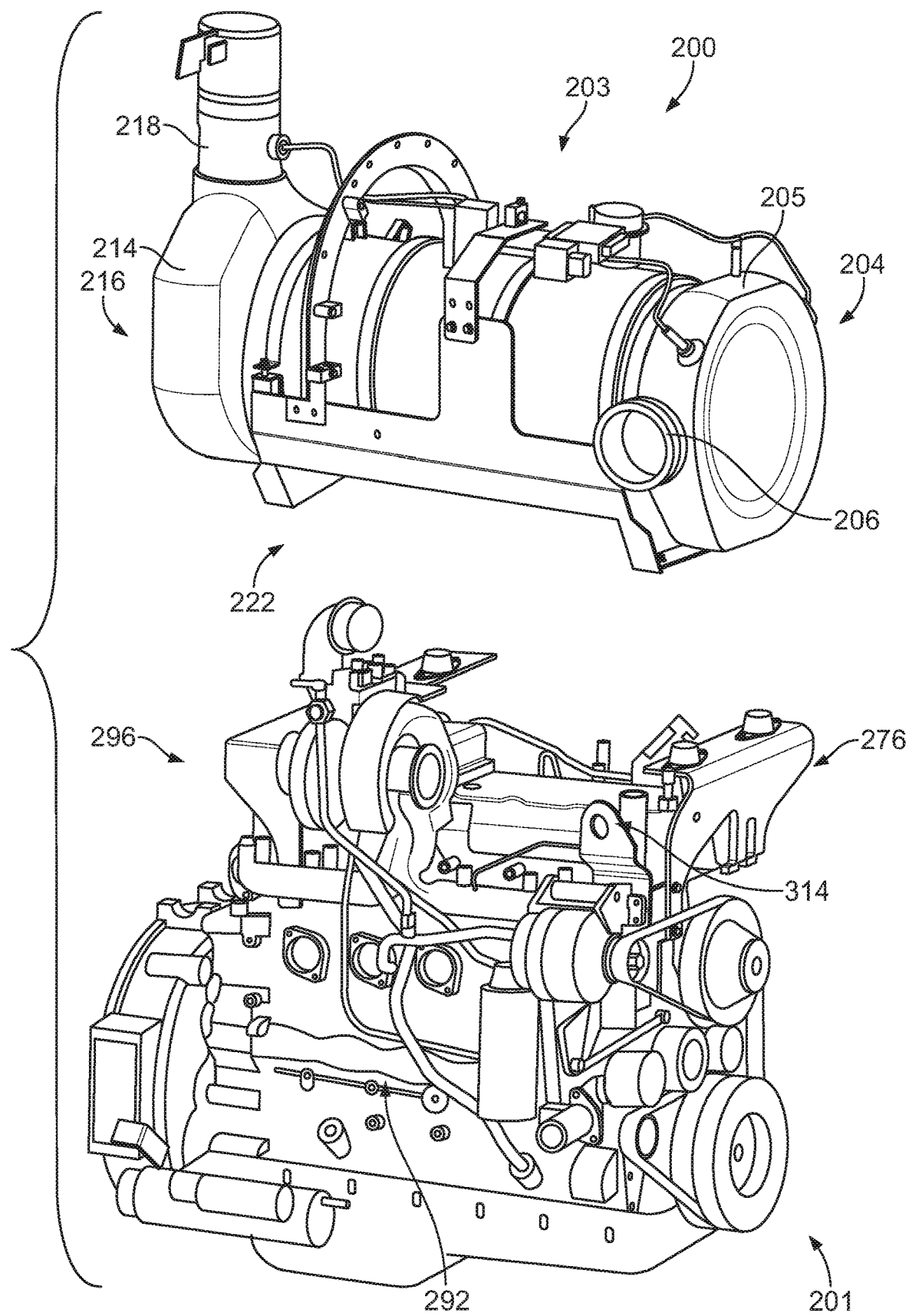
FIG. 10 is another perspective view of the internal combustion engine and exhaust gas aftertreatment system shown in FIG. 2.
Figure 11:
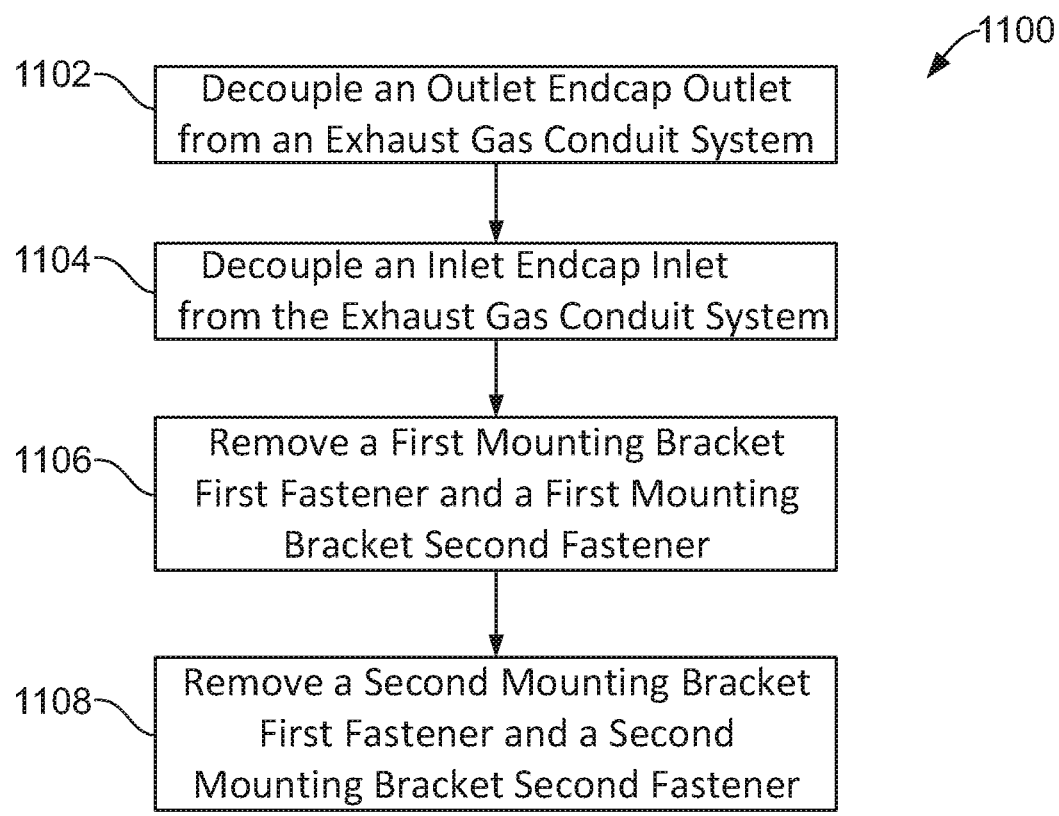
FIG. 11 is a flowchart of a process for removing an exhaust gas aftertreatment module from an internal combustion engine using an exhaust gas aftertreatment module support assembly, according to an example embodiment.

FIGS. 8-10 depict a process 1100 (e.g., method, etc.) for removing the exhaust gas aftertreatment module 203 using the exhaust gas aftertreatment module support assembly 222. The process 1100 is illustrated in FIG. 11. The process 1100 begins in block 1102 with decoupling the outlet endcap outlet 218 from the exhaust gas conduit system 104. For example, a band clamp holding the outlet endcap outlet 218 onto the exhaust gas conduit system 104 may be removed and the exhaust gas conduit system 104 subsequently separated from the outlet endcap outlet 218. FIG. 8 illustrates the internal combustion engine 201, the exhaust gas aftertreatment system 200, the exhaust gas aftertreatment module 203, and the exhaust gas aftertreatment module support assembly 222 after block 1102.

The process 1100 continues in block 1104 with decoupling the inlet endcap inlet 206 from the exhaust gas conduit system 104. For example, a band clamp holding the inlet endcap inlet 206 onto the exhaust gas conduit system 104 may be removed and the exhaust gas conduit system 104 subsequently separated from the inlet endcap inlet 206. FIG. 9 illustrates the internal combustion engine 201, the exhaust gas aftertreatment system 200, the exhaust gas aftertreatment module 203, and the exhaust gas aftertreatment module support assembly 222 after block 1104.

The process 1100 continues in block 1106 with removing the first mounting bracket first fastener 282 and the first mounting bracket second fastener 284. For example, the first mounting bracket first fastener 282 may be unthreaded from the first mounting bracket 276, drawn through the first mounting bracket first isolator 286, and unthreaded from the first cradle bracket 228 and the first mounting bracket second fastener 284 may be unthreaded from the first mounting bracket 276, drawn through the first mounting bracket second isolator 288, and unthreaded from the first cradle bracket 228. As a result, the first cradle bracket 228 is decoupled from the first mounting bracket 276.

The process 1100 continues in block 1108 with removing the second mounting bracket first fastener 302 and the second mounting bracket second fastener 304. For example, the second mounting bracket first fastener 302 may be unthreaded from the second mounting bracket 296, drawn through the second mounting bracket first isolator 306, and unthreaded from the second cradle bracket 232 and the second mounting bracket second fastener 304 may be unthreaded from the second mounting bracket 296, drawn through the second mounting bracket second isolator 308, and unthreaded from the second cradle bracket 232. As a result, the second cradle bracket 232 is decoupled from the second mounting bracket 296. The exhaust gas aftertreatment module 203 may then be lifted from the internal combustion engine 201 while the first mounting bracket 276 and the second mounting bracket 296 remain coupled to the internal combustion engine 201. FIG. 10 illustrates the internal combustion engine 201, the exhaust gas aftertreatment system 200, the exhaust gas aftertreatment module 203, and the exhaust gas aftertreatment module support assembly 222 after block 1108.

The process 1100 is completed after block 1108. After completion of the process 1100, the cylinder head 314 is exposed between the first mounting bracket 276 and the second mounting bracket 296 such that the cylinder head 314 may be serviced. FIG. 12 illustrates the internal combustion engine 201 with the cylinder head 314 exposed after completion of the process 1100. It is understood that the process 1100 could similarly be performed in other arrangements of block 1102, block 1104, block 1106, and block 1108.

Figure 13:
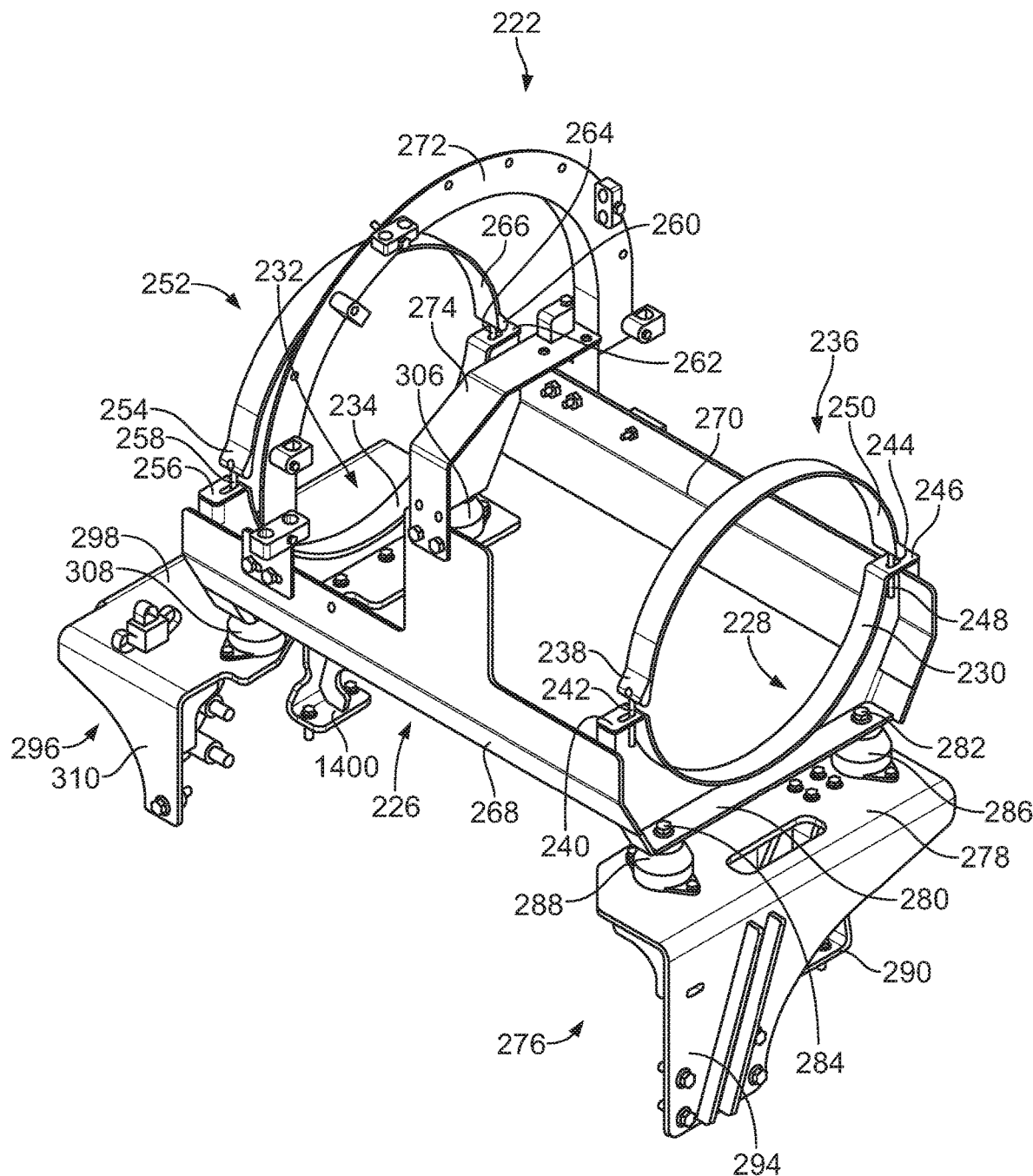
FIG. 13 is a perspective view of an exhaust gas aftertreatment module support assembly, according to an example embodiment.
Figure 14:
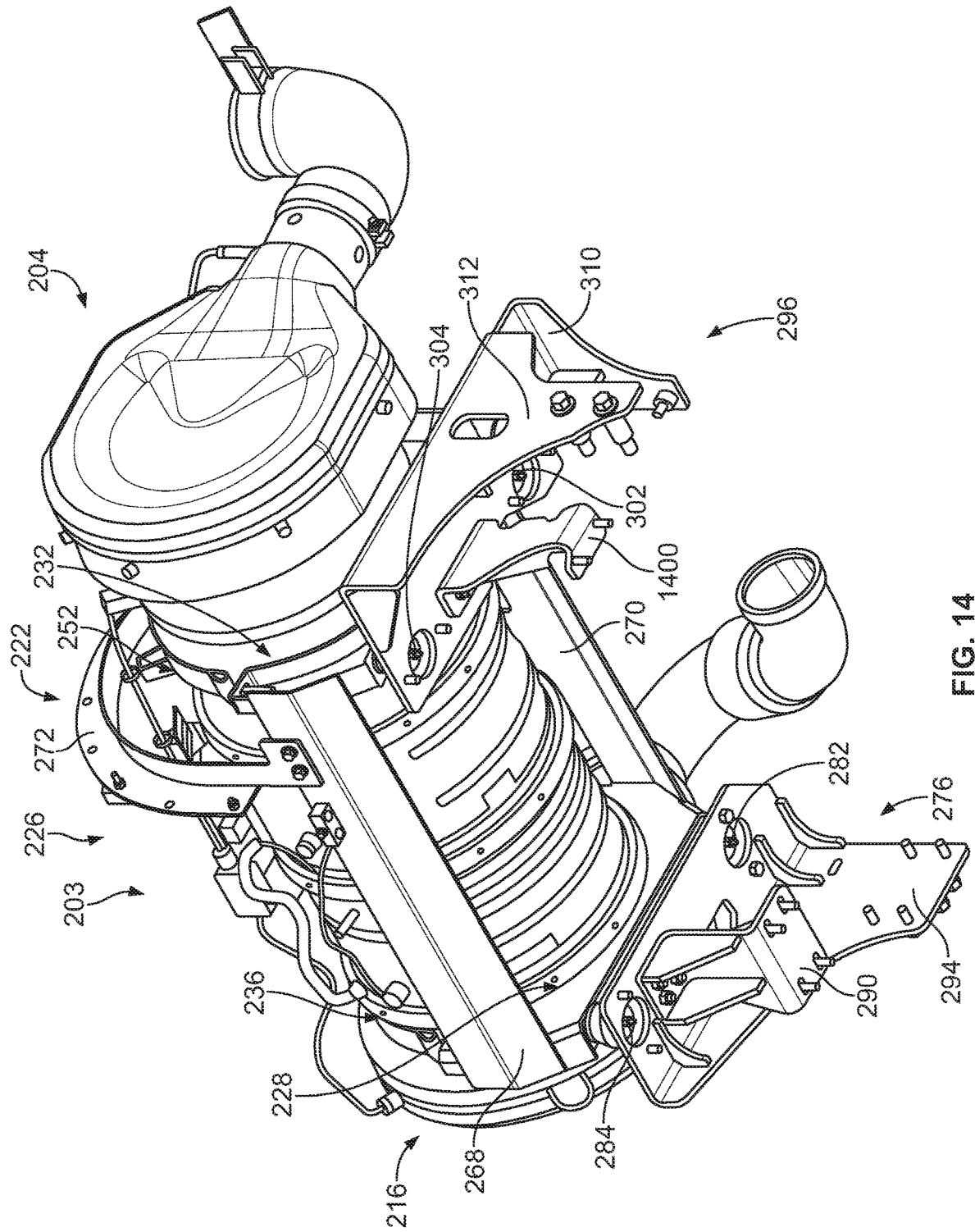
FIG. 14 is another perspective view of the exhaust gas aftertreatment module support assembly shown in FIG. 13.

FIGS. 13 and 14 illustrate the exhaust gas aftertreatment module support assembly 222 according to another example embodiment. The exhaust gas aftertreatment module support assembly 222 illustrated in FIGS. 13 and 14 may be for use with a different exhaust gas aftertreatment system 200 and/or internal combustion engine 201 than the exhaust gas aftertreatment module support assembly 222 illustrated in FIG. 3.

The first mounting bracket 276 in FIGS. 13 and 14 is different than the first mounting bracket 276 in FIG. 3. Specifically, the first mounting bracket second flange 290 is coupled to the first mounting bracket first flange 278, rather than being integrally formed with the first mounting bracket first flange 278.

The second mounting bracket 296 in FIGS. 13 and 14 is different than the second mounting bracket 296 in FIG. 3. Specifically, the second mounting bracket 296 further includes a second mounting bracket fourth flange 1400 (e.g., shelf, platform, etc.). The second mounting bracket fourth flange 1400 is configured to be coupled to the cylinder block 292 via fasteners. The second mounting bracket fourth flange 1400 is disposed along a plane that is orthogonal to a plane upon which the second mounting bracket first flange 298 is disposed and parallel to a plane upon which the second mounting bracket first flange 298 is disposed. It is understood that in various applications, the second mounting bracket fourth flange 1400 may be coupled to other engine structures instead of, or in addition to, the cylinder block 292.

Figure 15:
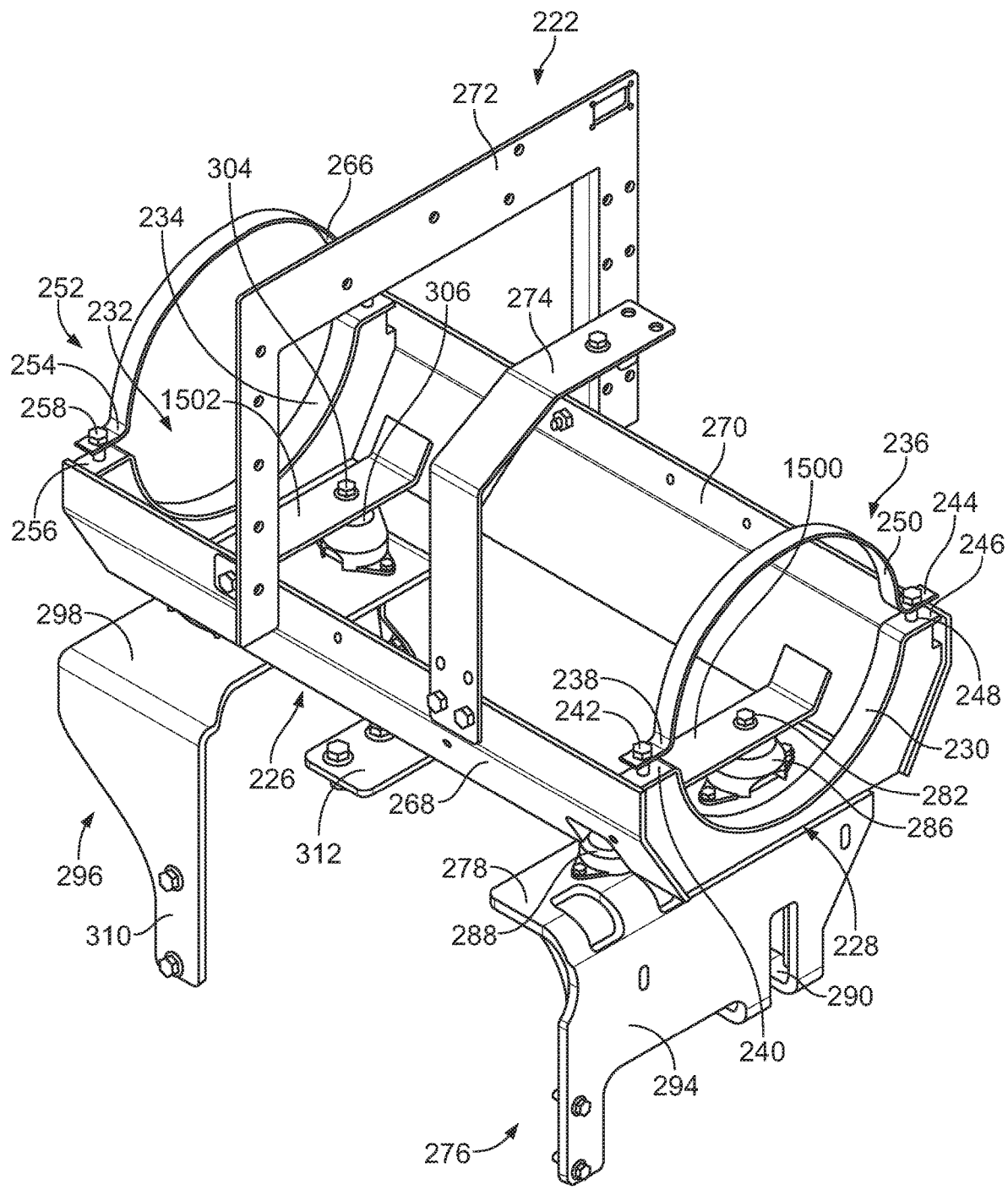
FIG. 15 is a perspective view of an exhaust gas aftertreatment module support assembly, according to an example embodiment.
Figure 16:
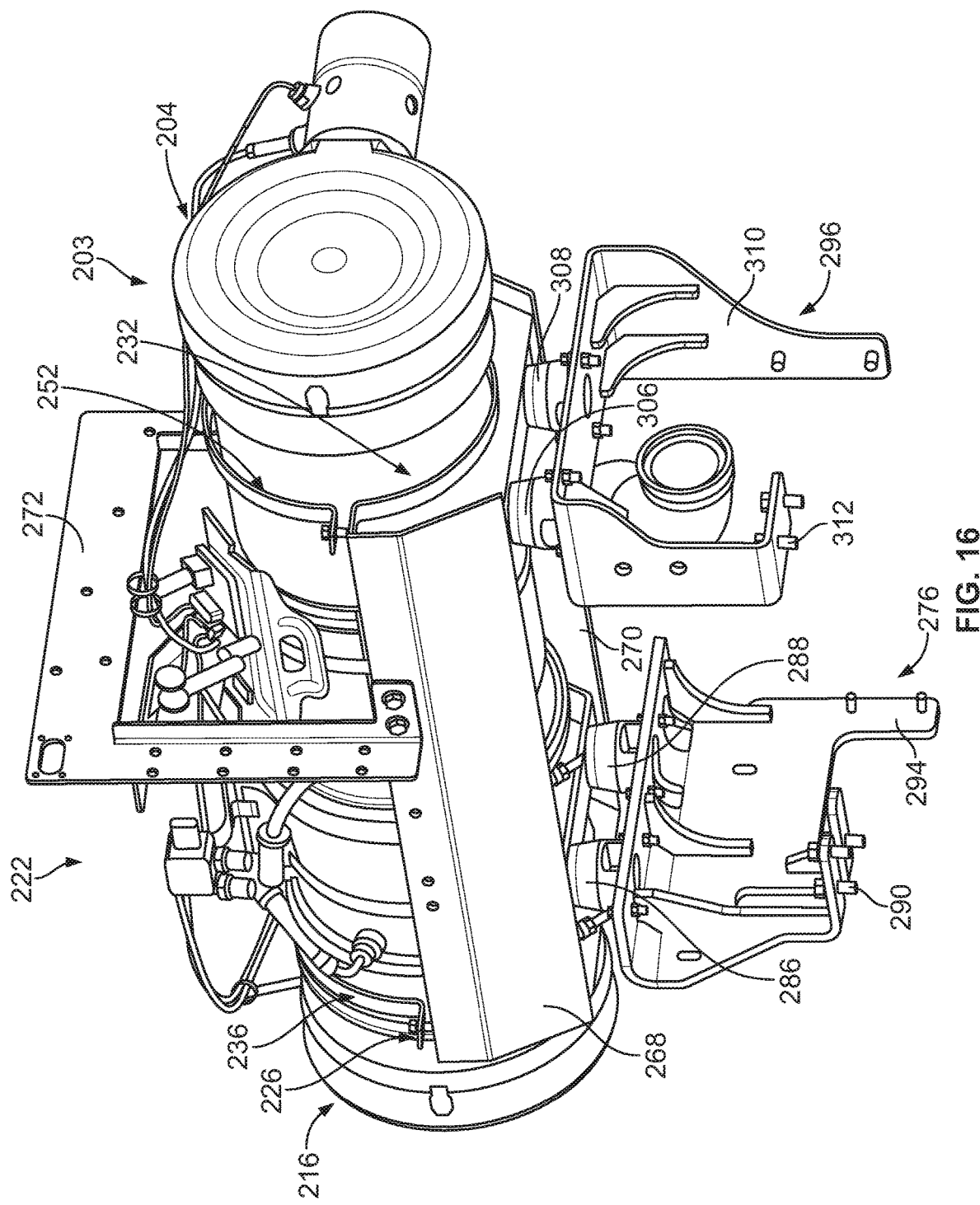
FIG. 16 is another perspective view of the exhaust gas aftertreatment module support assembly shown in FIG. 15.

FIGS. 15 and 16 illustrate the exhaust gas aftertreatment module support assembly 222 according to another example embodiment. The exhaust gas aftertreatment module support assembly 222 illustrated in FIGS. 15 and 16 may be for use with a different exhaust gas aftertreatment system 200 and/or internal combustion engine 201 than the exhaust gas aftertreatment module support assembly 222 illustrated in FIG. 3.

The first mounting bracket 276 in FIGS. 15 and 16 is different than the first mounting bracket 276 in FIG. 3. The first cradle bracket 228 does not receive the first mounting bracket first fastener 282 or the first mounting bracket second fastener 284, and the first cradle bracket 228 does not interface with the first mounting bracket first isolator 286 or the first mounting bracket second isolator 288. Similarly, the second cradle bracket 232 does not receive the second mounting bracket first fastener 302 or the second mounting bracket second fastener 304, and the second cradle bracket 232 does not interface with the second mounting bracket first isolator 306 or the second mounting bracket second isolator 308. Instead, the cradle assembly 226 further includes a first cross member 1500 (e.g., brace, bar, etc.) and a second cross member 1502 (e.g., brace, etc.). The first cross member 1500 and the second cross member 1502 are each coupled to both the first rail 268 and the second rail 270.

Additionally, the first cross member 1500 and the second cross member 1502 are each disposed along planes that are substantially parallel to planes upon which the first cradle bracket cradle surface 230 and the second cradle bracket cradle surface 234 are disposed. The first cross member 1500 is disposed proximate the first cradle bracket 228, receives the first mounting bracket first fastener 282 and the first mounting bracket second fastener 284, and interfaces with the first mounting bracket first isolator 286 or the first mounting bracket second isolator 288. Similarly, the second cross member 1502 is disposed proximate the second cradle bracket 232, receives the second mounting bracket first fastener 302 and the second mounting bracket second fastener 304, and interfaces with the second mounting bracket first isolator 306 or the second mounting bracket second isolator 308. As a result, the cradle assembly 226 is selectively coupled to the first mounting bracket 276 through the first cross member 1500 and to the second mounting bracket 296 through the second cross member 1502.

The second mounting bracket third flange 312 is disposed along a plane that is parallel to a plane upon which the second mounting bracket first flange 298 is disposed and orthogonal to a plane upon which the second mounting bracket second flange 310 is disposed.

Figure 17:
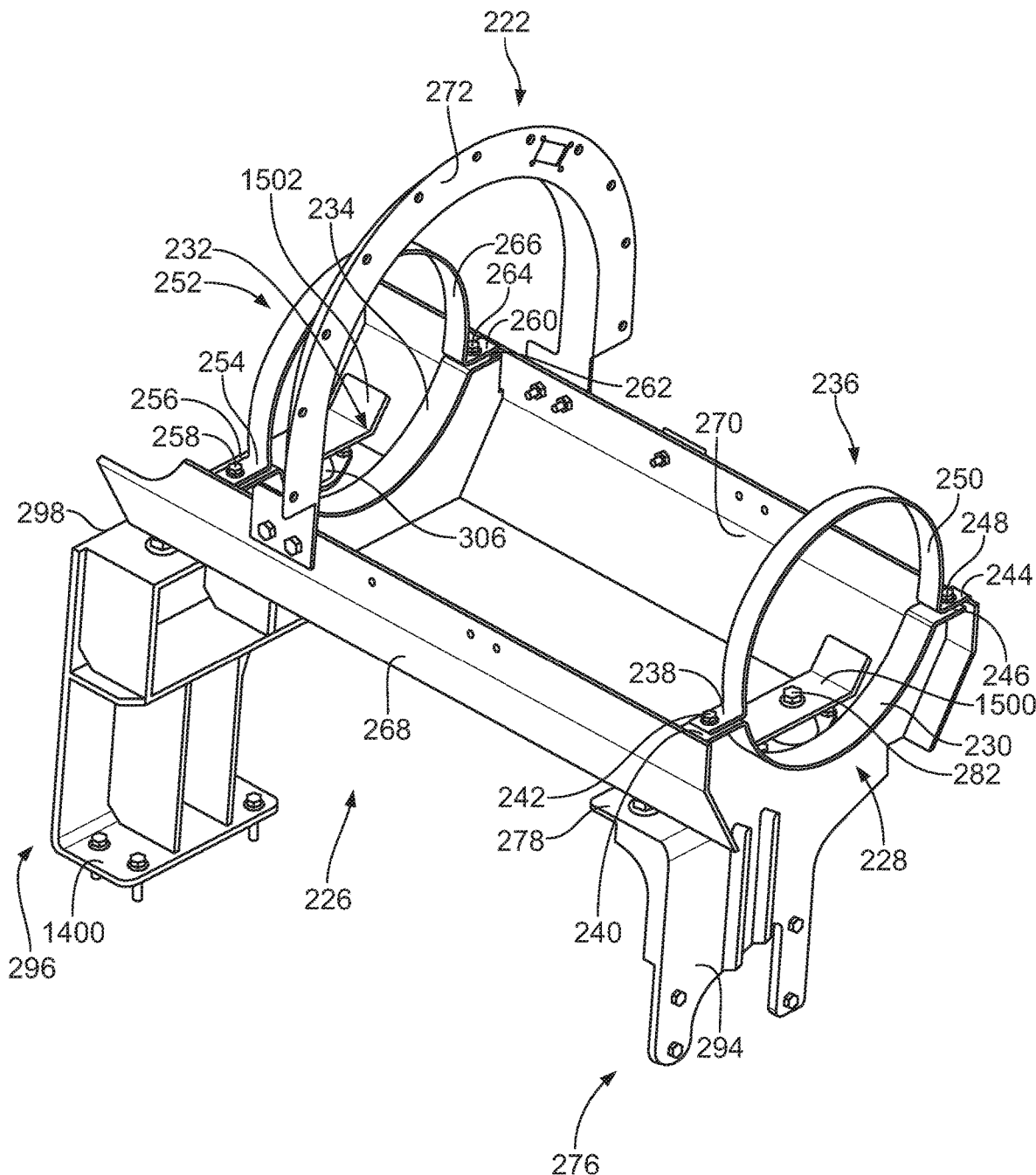
FIG. 17 is a perspective view of an exhaust gas aftertreatment module support assembly, according to an example embodiment.
Figure 18:
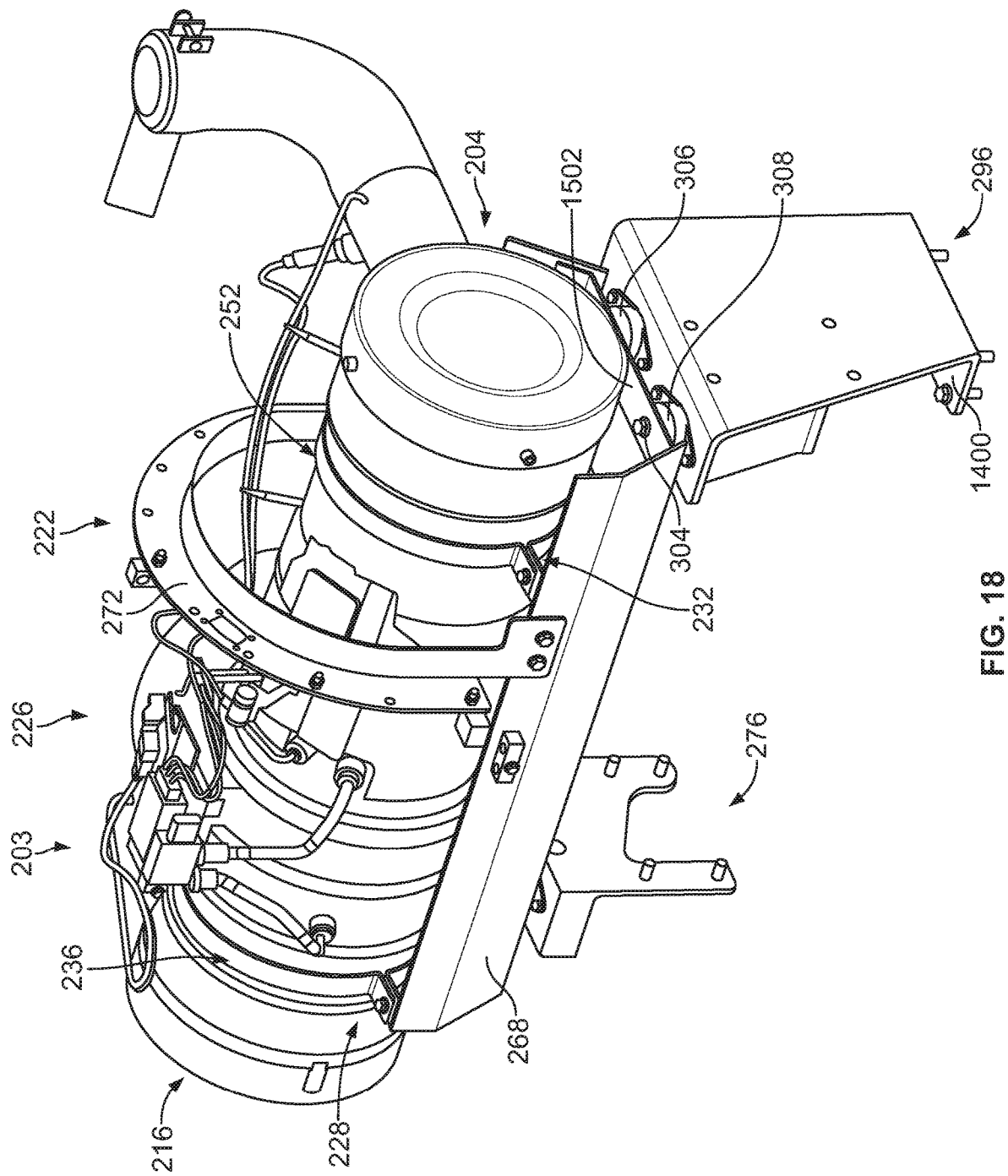
FIG. 18 is another perspective view of the exhaust gas aftertreatment module support assembly shown in FIG. 17.

FIGS. 17 and 18 illustrate the exhaust gas aftertreatment module support assembly 222 according to another example embodiment. The exhaust gas aftertreatment module support assembly 222 illustrated in FIGS. 17 and 18 may be for use with a different exhaust gas aftertreatment system 200 and/or internal combustion engine 201 than the exhaust gas aftertreatment module support assembly 222 illustrated in FIG. 3.

Similar to the exhaust gas aftertreatment module support assembly 222 illustrated in FIGS. 15 and 16, the cradle assembly 226 further includes the first cross member 1500 (and the second cross member 1502. However, rather than the being disposed between the first cradle bracket 228 and the second cradle bracket 232, the second cradle bracket 232 is located between the first cross member 1500 and the second cross member 1502. The second cross member 1502 is spaced apart from the body 208.

The first mounting bracket 276 in FIGS. 17 and 18 is different than the first mounting bracket 276 in FIG. 3. Specifically, the first mounting bracket 276 does not include the first mounting bracket second flange 290 and instead only includes the first mounting bracket third flange 294.

The second mounting bracket 296 in FIGS. 17 and 18 is different than the second mounting bracket 296 in FIG. 3. Specifically, the second mounting bracket 296 does not include the second mounting bracket second flange 310 or the second mounting bracket third flange 312. Instead, the second mounting bracket 296 only includes the second mounting bracket fourth flange 1400 as illustrated in FIGS. 13 and 14.

In various embodiments, various components of the exhaust gas aftertreatment module support assembly 222 are constructed from metal such as aluminum, steel, iron, stainless steel, iron alloy, aluminum alloy, titanium, and other similar metals. For example, various components of the exhaust gas aftertreatment module support assembly 222 may be formed via a metal casting process (e.g., investment casting, lost foam casting, sand casting, etc.) or a machining process (e.g., computer numerical control (CNC) machining, etc.).

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An exhaust gas aftertreatment module support assembly for supporting an exhaust gas aftertreatment module above a cylinder head and a cylinder block of an internal combustion engine, the exhaust gas aftertreatment module support assembly comprising:
    a first mounting bracket comprising:
        a first mounting bracket first flange disposed along a first plane; and
        a first mounting bracket second flange configured to be coupled to the cylinder block and disposed along a second plane that is angled relative to the first plane;
    a second mounting bracket configured to be coupled to the cylinder block; and
    a cradle assembly comprising:
        a first cradle bracket selectively coupled to the first mounting bracket first flange and having a first cradle bracket cradle surface configured to interface with the exhaust gas aftertreatment module; and
        a second cradle bracket selectively coupled to the second mounting bracket and having a second cradle bracket cradle surface configured to interface with the exhaust gas aftertreatment module;
    wherein the exhaust gas aftertreatment module is separated from the cylinder head when the cradle assembly is coupled to the first mounting bracket first flange and the second mounting bracket, the first cradle bracket interfacing with the exhaust gas aftertreatment module, and the second cradle bracket interfacing with the exhaust gas aftertreatment module.

2. The exhaust gas aftertreatment module support assembly of claim 1, wherein the cradle assembly further comprises:
    a first mounting bracket first isolator disposed between the first mounting bracket first flange and the first cradle bracket and separating the first mounting bracket first flange from the first cradle bracket; and
    a second mounting bracket first isolator disposed between the second mounting bracket and the second cradle bracket and separating the second mounting bracket from the second cradle bracket.

3. The exhaust gas aftertreatment module support assembly of claim 2, wherein the cradle assembly further comprises:
    a first mounting bracket first fastener extending through the first cradle bracket, the first mounting bracket first isolator, and the first mounting bracket first flange; and
    a second mounting bracket first fastener extending through the second cradle bracket, the second mounting bracket first isolator, and the second mounting bracket.

4. The exhaust gas aftertreatment module support assembly of claim 3, wherein:
    the first mounting bracket first fastener is separated from the internal combustion engine when the first mounting bracket second flange is coupled to the cylinder block and the second mounting bracket is coupled to the cylinder block; and
    the second mounting bracket first fastener is separated from the internal combustion engine when the first mounting bracket second flange is coupled to the cylinder block and the second mounting bracket is coupled to the cylinder block.

5. The exhaust gas aftertreatment module support assembly of claim 4, wherein the cradle assembly further comprises:
    a first mounting bracket second isolator disposed between the first mounting bracket first flange and the first cradle bracket and separating the first mounting bracket first flange from the first cradle bracket;
    a second mounting bracket second isolator disposed between the second mounting bracket and the second cradle bracket and separating the second mounting bracket from the second cradle bracket;
    a first mounting bracket second fastener extending through the first cradle bracket, the first mounting bracket second isolator, and the first mounting bracket first flange; and
    a second mounting bracket second fastener extending through the second cradle bracket, the second mounting bracket second isolator, and the second mounting bracket.

6. The exhaust gas aftertreatment module support assembly of claim 5, wherein:
    the first cradle bracket is coupled to the first mounting bracket only through the first mounting bracket first fastener and the first mounting bracket second fastener; and
    the second cradle bracket is coupled to the second mounting bracket only through the second mounting bracket first fastener and the second mounting bracket second fastener.

7. The exhaust gas aftertreatment module support assembly of claim 1, wherein:
    the cradle assembly further comprises a first rail coupled to the first cradle bracket and the second cradle bracket; and
    the first rail is at least one of:
        separated from the first mounting bracket by the first cradle bracket; or
        separated from the second mounting bracket by the second cradle bracket.

8. The exhaust gas aftertreatment module support assembly of claim 1, wherein:
    the cradle assembly further comprises a first cradle band coupled to the first cradle bracket and configured to bias the exhaust gas aftertreatment module against the first cradle bracket; and the first cradle band is at least partially disposed along a circular arc.

9. An exhaust gas aftertreatment module support assembly comprising:
a first mounting bracket, the first mounting bracket comprising a first mounting bracket first flange disposed along a first plane, and a first mounting bracket second flange configured to be coupled to a cylinder block and disposed along a second plane that is angled relative to the first plane;
a second mounting bracket; and
a cradle assembly selectively coupled to the first mounting bracket and the second mounting bracket, the cradle assembly comprising:
a first cradle bracket having a first cradle bracket first flange, a first cradle bracket second flange, and a first cradle bracket cradle surface extending between the first cradle bracket first flange and the first cradle bracket second flange and at least partially disposed along a first circular arc;
a first cradle band coupled to the first cradle bracket first flange and the first cradle bracket second flange and having a first cradle band cradle surface at least partially disposed along a second circular arc;
a second cradle bracket having a second cradle bracket first flange, a second cradle bracket second flange, and a second cradle bracket cradle surface extending between the second cradle bracket first flange and the second cradle bracket second flange and at least partially disposed along a third circular arc;
a second cradle band coupled to the second cradle bracket first flange and the second cradle bracket second flange and having a second cradle band cradle surface at least partially disposed along a fourth circular arc;
a first rail coupled to the first cradle bracket and the second cradle bracket; and
a second rail coupled to the first cradle bracket and the second cradle bracket.

10. The exhaust gas aftertreatment module support assembly of claim 9, wherein:
the first circular arc has a first radius;
the second circular arc has the first radius;
the third circular arc has the first radius;
the fourth circular arc has the first radius; and
the first rail is parallel to the second rail.

11. The exhaust gas aftertreatment module support assembly of claim 9, wherein the cradle assembly further comprises:
a first mounting bracket first isolator disposed between the first mounting bracket and the first cradle bracket and separating the first mounting bracket from the first cradle bracket;
a second mounting bracket first isolator disposed between the second mounting bracket and the second cradle bracket and separating the second mounting bracket from the second cradle bracket;
a first mounting bracket first fastener extending through the first cradle bracket, the first mounting bracket first isolator, and the first mounting bracket; and
a second mounting bracket first fastener extending through the second cradle bracket, the second mounting bracket first isolator, and the second mounting bracket.

12. An exhaust gas aftertreatment system for an internal combustion engine having a cylinder block and a cylinder head, the exhaust gas aftertreatment system comprising:
an exhaust gas aftertreatment module comprising:
an inlet endcap configured to receive exhaust gas;
a body configured to receive the exhaust gas from the inlet endcap; and
an outlet endcap configured to receive the exhaust gas from the body and to provide the exhaust gas; and
an exhaust gas aftertreatment module support assembly comprising:
a first mounting bracket configured to be coupled to the cylinder block, the first mounting bracket comprising:
a first mounting bracket first flange disposed along a first plane; and
a first mounting bracket second flange configured to be coupled to the cylinder block and disposed along a second plane that is angled relative to the first plane;
a second mounting bracket configured to be coupled to the cylinder block; and
a cradle assembly selectively coupled to the first mounting bracket first flange and the second mounting bracket, the cradle assembly comprising:
a first cradle bracket having a first cradle bracket cradle surface interfacing with the body adjacent the inlet endcap; and
a second cradle bracket having a second cradle bracket cradle surface interfacing with the body adjacent the outlet endcap, the second cradle bracket being identical to the first cradle bracket;
wherein the exhaust gas aftertreatment module is separated from the cylinder head when the cradle assembly is coupled to the first mounting bracket first flange and the second mounting bracket.

13. The exhaust gas aftertreatment system of claim 12, wherein the cradle assembly further comprises:
a first mounting bracket first isolator disposed between the first mounting bracket first flange and the first cradle bracket and separating the first mounting bracket first flange from the first cradle bracket;
a second mounting bracket first isolator disposed between the second mounting bracket and the second cradle bracket and separating the second mounting bracket from the second cradle bracket;
a first mounting bracket first fastener extending through the first cradle bracket, the first mounting bracket first isolator, and the first mounting bracket first flange; and
a second mounting bracket first fastener extending through the second cradle bracket, the second mounting bracket first isolator, and the second mounting bracket.

14. The exhaust gas aftertreatment system of claim 12, wherein:
the first cradle bracket cradle surface is at least partially disposed along a first circular arc;
the second cradle bracket cradle surface is at least partially disposed along a second circular arc;
the body is circular and defined by a first radius;
the first circular arc has the first radius; and
the second circular arc has the first radius.

15. The exhaust gas aftertreatment system of claim 12, wherein the second cradle bracket is identical to the first cradle bracket.

* * * * *